US010348704B2

(12) United States Patent
Figueira

(10) Patent No.: US 10,348,704 B2
(45) Date of Patent: Jul. 9, 2019

(54) METHOD FOR A DYNAMIC PERPETUAL ENCRYPTION CRYPTOSYSTEM

(71) Applicant: Helder Silvestre Paiva Figueira, London (GB)

(72) Inventor: Helder Silvestre Paiva Figueira, London (GB)

( * ) Notice: Subject to any disclaimer, the term of this patent is extended or adjusted under 35 U.S.C. 154(b) by 212 days.

(21) Appl. No.: 15/224,492

(22) Filed: Jul. 29, 2016

(65) Prior Publication Data

US 2017/0034167 A1   Feb. 2, 2017

Related U.S. Application Data

(60) Provisional application No. 62/198,828, filed on Jul. 30, 2015.

(51) Int. Cl.
*H04L 29/06* (2006.01)
(52) U.S. Cl.
CPC ........ *H04L 63/061* (2013.01); *H04L 63/0428* (2013.01)
(58) Field of Classification Search
None
See application file for complete search history.

(56) References Cited

U.S. PATENT DOCUMENTS

| 2002/0172359 | A1* | 11/2002 | Saarinen | G06F 7/588 380/46 |
| 2004/0064491 | A1* | 4/2004 | Rarick | G06F 7/582 708/250 |

(Continued)

*Primary Examiner* — Kenny S Lin

(74) *Attorney, Agent, or Firm* — Andrus Intellectual Property Law, LLP

(57) ABSTRACT

A dynamic computer communication security encryption method or system using an initial seed key and multiple random number generators of a specific design, whereby a sequence of independent random entropy values is produced by one set of random number generators and encrypted along with the message stream using the initial seed key, or the output of a second set of random number generators initialized with the initial seed key, and following the subsequent transmission of the variable encrypted entropy/message block, the entropy values are used to symmetrically or identically augment or increase the current uncertainty or entropy of the cryptosystem at both the sender and the receiver, prior to the next encryption block operation. The encryption process effectively entailing the use of multiple encryption ciphers, and the entropy augmentation process entailing the encryption or application of various logical mathematical operations on the already dynamic but deterministic internal state values of the second set of random number generators, effectively altering their deterministic outputs in a random probabilistic manner.

Random length message value sequences from one or more data sources is combined with one or more random length entropy value sequences from an independent source, following which the entropy "updates" may also be used to alter, or change any cryptosystem variable, value or component in a randomly determined manner. In addition, while ensuring synchronization, the random entropy sequences also serve to "pollute" the cipher-stream and thereby hinder most current forms of cryptanalysis, while simultaneously injecting additional entropy into the cryptographic system and allowing for its propagation to affect any connected system nodes, and thereby introducing unpredictable entropy into the system pseudorandom number generator outputs, and thereby ensuring the perpetual generation of unpredictable random numbers.

Super-encryption mechanics are independent of the user data, simple, fast and efficient, and can incorporate compression, error correction and asymmetric encryption authentication routines. But most importantly, super-encryp- (Continued)

tion ensures resistance to brute force attacks (not possible to verify if a message was even sent), an ability to exceed "perfect secrecy" requirements, and an improvement on previous super-encipherment design, since overhead can be dramatically reduced from 100% overhead.

Communication links previously established by system nodes with central authorities may be used for secure node authentication and registration, while allowing the central authority to broker and synchronize communication channels and providing mutual authentication and other security functions between the system nodes.

7 Claims, 7 Drawing Sheets

(56) References Cited

U.S. PATENT DOCUMENTS

| | | | | |
|---|---|---|---|---|
| 2007/0230694 | A1* | 10/2007 | Rose | G06F 7/58 380/46 |
| 2008/0263117 | A1* | 10/2008 | Rose | G06F 7/582 708/254 |
| 2009/0225985 | A1* | 9/2009 | Dolev | H04L 9/0656 380/270 |
| 2013/0318139 | A1* | 11/2013 | Park | G06F 7/582 708/251 |

* cited by examiner

FIGURE 1A – Basic Random Number Generator with a Single Output Stream

FIGURE 1B – Complex Random Number Generator with Multiple States, Instances and Output Streams FIGURE 2 – Basic Random Number Generator example with a Single Output Stream

METHOD FOR A DYNAMIC PERPETUAL ENCRYPTION CRYPTOSYSTEM

CROSS REFERENCE TO RELATED APPLICATIONS

U.S. Pat. No. 1,310,719—Gilbert Vernam—"Secret Signaling System"

U.S. Pat. No. 5,412,730—Michael F. Jones—"Encrypted Data Transmission System Employing Means for Randomly Altering the Encryption Key"

U.S. Pat. No. 7,376,232,—Hamdy Soliman—"Computer System Security Via Dynamic Encryption"

STATEMENT REGARDING FEDERALLY SPONSORED RESEARCH OR DEVELOPMENT

Not Applicable

BACKGROUND OF THE INVENTION (1) Field of Invention

The present invention relates to data transmission and computer security systems and more particularly, to multi-cypher encryption and decryption, multi-source random number generation and to systems for transmitting multiple encrypted data streams.

In particular, the present invention relates to a random number generation and encryption method or system which uses a distributed framework of multiple random or pseudo-random number generators producing infinite length multiple keystreams, to support a dynamic super-encryption cipher-stream (a continuous sequence of variable length ciphertext segments each encrypted with a unique key) which is used to transmit data between system nodes, and also transmit random entropy updates which are used to perpetually augment the entropy or uncertainty of the cryptosystem mechanics, variables, configuration, state or the composition of the random number generators used to generate the required random number outputs.

(2) Description of the Related Art

Cryptography provides a means of security for transmitted data by transforming messages from "plaintext" to "ciphertext" using a secret "key" and an encryption and decryption algorithm.

This invention relates specifically to "true" secrecy cryptosystems, in that the meaning of the messages being transmitted are concealed by a cipher or code and the adversary is assumed to have any special equipment necessary to intercept and record the transmitted signal; as defined in the document—Shannon, Claude (1949) "Communication Theory of Secrecy Systems", Bell System Tech. J., Vol. 28, pp. 656-715.

In typical "symmetric" encryption usage scenarios, the transmitted data is encrypted by a sender using a unique key value (such as a 256-bit binary number) and unscrambled at the receiver, by a reverse process that requires the same key value to be known, whereas with "asymmetric encryption", different key values are used which are mathematical inverse functions of the first unique key value, such as ¼ and 4/1. Since these keys are almost always shorter than the messages they encrypt, a means of applying the key to longer messages is used. With block cyphers, the key is in essence repeated with every block of message data that is encrypted (may include a transformation of the key between blocks), whereas with stream ciphers the key is applied to a pseudo-random number generator (hereinafter called "PRNG") to produce a long keystream which is then used for encryption and decryption purposes.

Ordinarily, the strength of a cryptosystem may be considered to be directly proportional to the length of the initial key, but this assumption is subject to the condition that the ciphertext is shorter than a value that Claude Shannon called the "unicity distance". Cryptographic algorithms which produce ciphertexts which exceed the unicity distance, which is the length of the initial key plus the minimum length which could be used to convey the message, are inherently insecure, and are guaranteed to produce a single correct decipherment. Since the encryption strength of any encryption algorithm decays in proportion to the length of the ciphertext which exceeds the "unicity distance", statistical decryption techniques such as equivocation are far more efficient than brute force decryption.

A simple and secure cryptosystem which is not subject to equivocation attack risks, has been around since 1882. The "one-time" pad (hereinafter referred to as "OTP") or Vernam Cipher, was originally invented by Frank Miller and patented in 1917 by Gibert Vernam (U.S. Pat. No. 1,310,719 entitled "Secret Signalling System"). The OTP has the distinction as being the only cryptosystem to date to have been mathematically proven to be "perfectly secret" (as defined by Claude Shannon) if used correctly, in that an adversary is unable to compromise the cipher given infinite time, infinite computing resources, and any number of plaintext/cyphertext pairs. It is the object of this invention to introduce a new "information theoretically secure" cryptosystem.

The OTP's "perfect secrecy" is dependent on the following conditions being met: (1) The key used must be truly random—the key must therefore be unpredictable or insignificant in every sense of value, position or distribution, (2) The key must be at least as long as the plaintext, if not longer, and never repeated in whole or in part, and (3) The keys must be kept completely secret during generation, distribution, usage and storage.

Claude Shannon, in dealing with secrecy cryptosystems in general, asserted that the OTP complied with the requirements for "perfect secrecy"—namely that the ciphertext can be translated into any plaintext of the same length, all of which are equally likely, if a truly random key was used. More specifically, he defined "perfect secrecy" as meeting the criterion that "the a priori probability of a plaintext message M is the same as the a posteriori probability of a plaintext message M given the corresponding ciphertext". Further, he explained that perfect secrecy is possible but requires that the keys must be generated at the same or higher rate than the messages, and be at least as long as the messages. Strictly speaking, by the above definition, perfect secrecy can never be obtained using block cyphers or seed-fed stream ciphers, since the input entropy is limited to the seed or key size.

Despite these cryptographic strengths, practical problems have prevented OTPs from being widely applied in a practical manner, including: (1) The Random Number Generation Problem—The problem in generating unpredictable infinite length one-time pad sequences, which is a serious problem if one is using single independent pseudo-random number generators (hereinafter called "PRNGs"), (2) The Distribution Problem—in that the required OTP values must be securely generated and exchanged between the sender and receiver, and be at least as long as the messages to be sent, and (3) The Key Management Problem—in that the OTPs must be kept secret and be immediately and irrevocably disposed of in a secure manner.

In addition to the problems mentioned above, the OTP also suffers from the following issues: (1) known ciphertext length, (2) ciphertext readily visible for analysis, (3) lack of user authentication, (4) lack of message verification and error correction, (5) ciphertext position is relative to plaintext.

In addressing the Random Number Generation problem with regards to "perfect secrecy" systems and the "one-time pad", any numbers that are generated and used as keys in a cryptosystem must be truly random and thus, unpredictable in any conceivable manner. There are two principal methods or types of random number generators (hereinafter called RNGs) used currently to generate random numbers, namely "true random number generators" (hereinafter referred to as TRNGs) and "pseudorandom number generators" (hereinafter referred to as PRNGs). TRNGs measure some physical phenomenon that is expected to have random characteristics and compensate for possible biases in the measurement process. Drawbacks to this approach include the need for measuring apparatus, and there are limitations to the rate at which random numbers (or "entropy"—a measure of unpredictability of information content) can be harvested since there is a dependency on the underlying rate of measurement. PRNGs entail the use of computational algorithms or functions to produce long sequences of apparently random results, which are actually completely predetermined by a smaller initial value, or seed. PRNGs tend to be fast, and act alone with the exception of input seeds which can be provided independently or are functions of their output. There are two distinct types of PRNGs—linear congruential generators which use a mathematical calculation and use outputs as a means of deriving inputs in a cyclic manner, and probability distribution generators which perform various operations on a data set or table (such as ARC4—a well-known stream cypher). Since both types of PRNGs use small seed or initialization values, there is a cryptographic quality issue in that that the entropy of the output number sequences with a PRNG is limited to the entropy of the input seed entropy. For example, if a numeral from 1 to 9 is used as a seed in a pseudorandom number generator, there may be a maximum of 10 variations of output, irrespective of the length of their output sequences. Therefore, PRNGs initialized using a seed value cannot satisfy the requirements of "information theoretic" security since their output keys are only truly random until they exceed the length of the input seed key.

It is therefore a specific objective of the current invention to address the random number generation problem through the manipulation of multiple RNGs or more specifically, the manipulation of the RNG internal states, operating within the cryptographic system.

Since constant reuse or use (in the case of stream ciphers) of the same key is cryptographically insecure due to the consumption of key entropy through normal use (resulting in a reduction in equivocation), in order to increase security, encryption key values may be frequently changed (with a penalty to bandwidth usage) to continuously add entropy to the cryptosystem, reduce the probability that an adversary may compromise the cryptosystem by intercepting and deciphering the encrypted messages, and thus requires new key values to be sent frequently by the sender to the receiver. In U.S. Pat. No. 5,412,730, Michael F. Jones "Encrypted Data Transmission System Employing Means for Randomly Altering the Encryption Key" we find such a method whereby new keys may be generated by a single independent RNG located at the sender, encrypted with the currently active key and transmitted along with normal data. Following decryption of the cipher-stream at the receiving station or entity, the encrypted keys are extracted from the data-stream, decrypted, and substituted for the prior key at a predetermined or designated point in time.

However, even such dynamic systems have numerous weaknesses, in that (a) pseudorandom keys are generated using PRNGs which eventually become predictable, (b) keys are stored and susceptible to interception and compromise, (c) keys are limited in length, and thus present a limit in cryptographic entropy and strength, even though resultant pseudo-key material is longer than the original key, (d) keys are reused, or transformed in a linear manner through functions, making equivocation analysis attacks viable, (e) the ciphertext is readily visible facilitating cryptanalysis attack and (f) the above issues lead to situations where the deciphering of a single key leads to compromise of successive and previous keys, and eventually to a compromise of all previous and future transmitted data.

In accordance with a principle feature of the present invention, multiple RNGs are deployed at both the sending and receiving stations or entities (may be users, machines, network devices, groups etc.) in that some RNGs are used to generate a sequence of random entropy values, which are mixed with message sequences, and communicated in an encrypted format, and are then used to alter the deterministic mechanics of the cryptosystem or it's RNGs in a probabilistic manner without actually communicating any keys, but merely the means of key generation. This mechanism therefore serves to "update" the entropy of the cryptosystem which ordinarily would be limited to the initial keys used, and will allow for an information theoretically secure cryptosystem, provided the rate of entropy updates exceeds the rate of entropy depletion. Whilst it is possible to pass new keys along in such a manner, or to pass updates which can be applied to existing keys to generate new keys, the rate of entropy depletion will usually be greater than the rate of entropy updates, which is why this technique is not generally used in cryptography. The solution to the problem of updating entropy at a faster rate than the depletion can be accomplished if a large entropy pool is used such as that found in a stateful random number generator. Merely passing the entropy updates between sender and receiver does not divulge any resultant keystreams or keys. In addition, provided an independent RNG is used to generate the entropy updates, and the entropy values are pre-encrypted with a shared key before being joined to normal messages or control values in randomly composed encryption blocks, and subsequently encrypted with the outputs of a second RNG, it is mathematically possible to augment the rate of entropy (or uncertainty) in the cryptosystem faster than it can be depleted through normal use. Doing this in a perpetually synchronized manner between sender and receiver, effectively results in a perpetual information theoretically secure cryptosystem, provided the proportion of entropy updates is larger than the amount of redundancy in the messages being communicated.

In accordance with the invention, in order to allow the two sending and receiving entities to continue communication using a random keystream, each is supplied in advance with a separate random number sequence which exclusively determines the numerical sequence and content of the random numbers produced by the two synchronized RNGs. Whilst the separate random number sequence may be used as a seed to restart the random number generation process at a predetermined time (as is found in prior art), it can alternatively be used to great advantage to alter a portion or the entirety of the output sequences of the RNGs, by altering a portion or the entirety of their internal states. Alternatively, it can be used for other purposes, such as allowing for variation in the encryption mechanics used, or for altering a portion or the entirety of the encrypted ciphertext prior to transmission.

In accordance with the principle feature of the invention, an additional independent entropy source like another RNG is used to generate random sequences of numbers of random length (entropy), which is then randomly and continuously injected into the data-stream or crypto-stream of stream ciphers, or into block ciphers, in order to randomly alter various components of the cryptosystem separately or in union, namely the output, the mechanics or the internal states of random number generators, or the mechanics or composition of the encryption algorithms, or the composition or characteristics of the plaintext prior to encryption, or the ciphertext after encryption prior to transmission. In order that the two generators switch from the previous cryptographic configuration to the next in synchronicity, means are employed at the sender to construct transmission packages which include data messages, random update information, other information and control information. Following encryption at the sender, transmission and decryption at the receiver, previous control information is used to deconstruct the package into its separate components and process data, updates, other information and control information accordingly. The construction and encryption, or deconstruction and decryption, of transmission packages (which may be fixed or randomly variable in length), may be referred to as an "encryption cycle". Following the completion of an encryption cycle at the sender or the receiver, encryption configuration changes are applied to the respective cryptosystem components, and the new control information variables become active, replacing the old control variables. This continuous update process continues indefinitely until the communication link is terminated.

Without reiterating the above problems, it is therefore an object of the current invention to provide a method and a system which addresses the above problems whilst remaining within the confines of the characteristics of a "perfect secrecy" cryptosystem.

Until 1976, symmetric cryptosystems (that use a similar encryption and decryption key) like the one-time pad, were the predominant cryptosystem in practice. Unlike the one-time pad, most symmetric cryptosystems were block cyphers or stream ciphers, which used keys that were usually smaller than the message being transmitted. In the case of block ciphers the use of smaller repeating keys is not a cryptographically secure means of encryption, for two reasons, firstly it results in a decrease in the size of the cryptographic problem (by limiting the amount of cryptographic input entropy in a cryptosystem—the reason why "one time" pads should have keys as long as the message), and secondly, it allows for the implementation of equivocation techniques which use statistical means to compromise the cipher without having to resort to brute force techniques of trying every possible key (the reason why keys should never be repeated). Stream ciphers on the other hand use small keys as seeds to PRNGs for the generation of lengthy output keystreams, but the use of limited length seeds again results in a decrease of cryptographic entropy of the output key stream, the very reason why "perfect secrecy" systems require keys to be as long as the message. For stream ciphers or block ciphers to attain "perfect secrecy", they must continuously receive random seeds, which results in 100% overhead to their message length and decreases their processing efficiency.

It is therefore a specific objective of the current invention to address the problem with ensuring that the one-time perpetual keys that are generated within the cryptosystem, can be initiated by a single set of initialisation values or keys, yet be able to maintain their unpredictable and perpetually random nature, through random feedback and synchronization updates between RNGs operating within the cryptographic system.

Like the one-time pad, all symmetric ciphers had the inherent "Distribution Problem" in that the original keys or seeds used for encryption and decryption must first be communicated between sender and receiver using a secure means of transfer. The security of any cryptographic system is only as secure as the initial key exchange, and the transfer process is prone to theft, interception, and alteration, defeating the purpose of the underlying cryptosystem.

The invention of asymmetric encryption (using different but related keys to encrypt and decrypt—such as private and public keys) addressed the distribution problem to a large extent allowing for limited length key distribution over insecure communication links, whilst also introducing authentication, verification and revocation properties which were previously absent in symmetric cryptosystems, an enormous achievement. However, this was achieved at the considerable expense of replacing previously mathematically proven "secure" (unbreakable) cryptosystems with a design alternative that relied on the unproven or assumed difficulty of solving certain mathematically "hard" problems.

It is therefore apparent that a need exists for a cryptosystem or cryptographic technique to address the issues that hampered the practical adoption of the one-time pad, by solving the randomness problem, the distribution problem, the key management problem, allowing for the use of asymmetric encryption advantages through the use of efficient super-encryption without compromising sound cryptographic principles by adhering to the basic requirements of a "perfect secrecy" cryptosystem. The present invention is directed toward providing such a technique and is unique in combining an autonomous network of multiple independent RNGs and an efficient super-encryption capability which is able to support asymmetric encryption solutions, as a viable means of addressing the problems mentioned above.

It is an object of the current invention to use the basic mechanics and principles of the OTP (true random numbers as long as the messages) as a foundation to the cryptosystem, and augmenting it where necessary with techniques to address past issues and keep all cryptosystem mechanics and functions dynamic, autonomous and independent from direct user interaction due to key input or message content. Thus ensuring that keys or RNG states are not readily available to user access since individual key values are automatically and dynamically generated, used and destroyed.

It is therefore an object of the current invention to provide a method and a system for the proper and cryptographically secure generation of unpredictable random numbers by dynamically and randomly synchronizing the state of independent random and pseudo-random number generators (RNGs) in an interconnected RNG communication network. The propagation of synchronicity entropy changes at a specific system node has the desirable side-effect in that its entropy impact may eventually be propagated across the entire network to other connected system nodes.

Another object of the current invention is to use the cryptographically secure output of multiple RNGs to perpetually and randomly add entropy to the encryption sequence in a manner similar to that found in prior art and referred to as "dynamic encryption" systems. Dynamic encryption attempts are described in U.S. Pat. No. 7,376,232, by Hamdy Soliman entitled "Computer System Security Via Dynamic Encryption", and U.S. Pat. No. 5,412,730 by Michael F. Jones entitled "Encrypted Data Transmission System Employing Means for Randomly Altering the Encryption Keys", but the present invention differs from previous art substantially in that it does not rely on the limited entropy of previous keys or data as a means of dynamic propagation, nor do keys get transferred over communication link, but in the transfer of an random length RNG state changes within a super-encrypted cipher-stream, which presents a more efficient and stochastic improvement, albeit at the price of expansion in message length, another reason why this technique does not appear in prior art, since message expansion is generally considered undesirable.

With regard to stream cyphers, ARC4, designed by Ron Rivest in 1987 and leaked to the public in 1994, is remarkable in its simplicity and speed in software. However, ARC4 has vulnerable weaknesses that argue against its use in new systems, such as not discarding the beginning of output streams, or when nonrandom keys are used. Additional problems identified by cryptanalysts with ARC4 include (a) a weak initial key scheduling algorithm, (b) a predictable starting distribution, (c) a uniform value distribution in that each value in the 256 byte secret state is unique and changed in location only, (d) a lack of additional input entropy following initialisation.

It is an object of this invention to introduce a viable and dynamic RNG (identified in the invention as a "Hi-Generator") which addresses the problems identified with ARC4. Besides differences in the secret internal index pointers and state size, which can be randomly predetermined to be less or higher than 256 bytes, and can dynamically change its size during operation, it has no scheduling algorithm, nor a uniform distribution of unique values—all state values are random. In addition the pseudo-random generation algorithm does not merely relocate values, but amends them, in that each operation results in 3 or more additionally amended values. The most important difference being introduced with Hi-Generators, is that independent dynamic random changes are intermittently performed on the internal secret state of the RNG during normal operations, through the use of entropy updates. To conserve entropy, amended values need not be discarded but can be transferred to other Hi-Generators. These updates may be applied in an effort to synchronize variations in the output stream between synchronized RNGs, or to distribute the impact of entropy updates to unsynchronized RNGs.

A further object of the current invention is to simultaneously super-encrypt the combined data transmissions and entropy updates within a variable length message package, thereby using the RNG synchronization updates to "pollute" or "contaminate" the resulting cipher-text sequence for the message, making the cryptosystem resistant to linear and differential cryptanalysis, and removing the assumption that a message was even sent.

A further object of the current invention is to provide an efficient technique for the super-encryption of messages that incurs less than 100% overhead in message length, and which is able to shield the cipher-text from cryptographic analysis and address the "magic number" and "null string" problems.

A further object of the current encryption is to allow for the integration of existing authentication and verification asymmetric encryption mechanisms (used for user authentication, identification information, keys or certificates) into the encryption process itself, greatly adding to the security of asymmetric encryption systems and extending the present invention cryptosystem to include central authority control and management functions, and supporting the distribution and authentication of cryptosystem entities (users, machines, systems, data, access control and services etc.), the establishment of secure communication links between vetted entities, and eliminate the possibility of unidentified entities communicating to any other entity within in the cryptosystem network.

A further object of the invention is to provide a single efficient, fast and scalable means of encryption which can be used for all eventualities, namely encryption of data at rest, data in transit over communication channels, and for the provision of a means of authenticating network entities.

A further object of the invention is to provide a means for ensuring that all traffic flowing within the cryptosystem network remains behind a logical security boundary, whereby access to and from specific system nodes is controlled identified and kept under user or management control.

These and other objects, features and advantages of the invention will be apparent to those skilled in the art, and more clearly understood by considering the following detailed description of specific embodiments of the invention.

BRIEF SUMMARY OF THE INVENTION

The purpose of this invention is to provide a secure cryptographic method and system capable of securing the transfer of data within and between computer systems, whilst addressing the problems of pseudo-random number generation, infinite length keystreams and efficient super-encryption.

To this end, the cryptosystem uses multiple RNGs (preferably of a type known as Hi-Generators) to produce multiple random keystreams which are used, for the encryption (preferably using the Hi-Encrypt super-encryption algorithm) of normal data transmissions and the transfer of random entropy updates to other system entities (nodes, users, data, RNGs, machines, devices, computers, etc.).

In so doing the invention addresses the following problems:
(a) the difficulty in producing unpredictable infinite length random number sequences which are at least as long as the messages which need to be transmitted, (b) protecting the cipher-text through multiple encryption, from most cryptographic attack vectors, including brute-force attacks through the use of a non-deterministic encryption method which allows for "perfect secrecy" and results in multiple false positives, (c) providing a secure means of secret key generation, distribution, use, disposal and storage to prevent key interception, (d) providing a secure means of initial key distribution without exposing public or private key contents to unauthorized parties, (e) allowing for central authority management of network entities, (f) preventing unauthorized parties from interfering with or intercepting dynamic keys through replay or man-in-the-middle attacks, since no actual keys are transmitted over communication links and interference with the key generation mechanism ultimately leads to intrusion detection, and resynchronization of the specifically affected encrypted channel.

The use of Hi-Generate RNGs and the Hi-Encrypt super-encryption algorithm results in a cryptosystem with both "perfect secrecy" and "ideal secrecy" characteristics.

This and other features and advantages of the invention may be more clearly understood by considering the following detailed description of specific embodiments of the invention.

BRIEF DESCRIPTION OF THE SEVERAL VIEWS OF THE DRAWINGS

In the course of the brief and detailed description to follow, reference will be made to the following attached drawings, in which.

DETAILED DESCRIPTION OF THE INVENTION

Terms and Definitions

Figure 1:
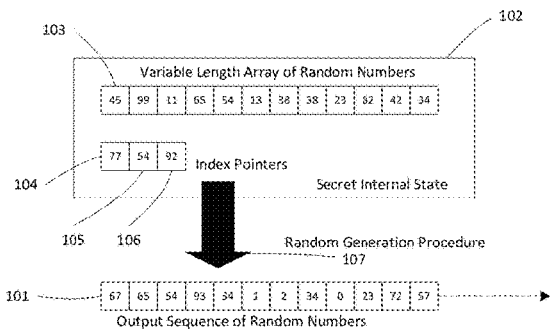
FIG. 1a. is an illustration demonstrating the basic random number generator components as contemplated by the invention, FIG. 1b. is an illustration demonstrating the relationship between various random number generation configurations and their various output streams, as contemplated by the invention.
Figure 1:
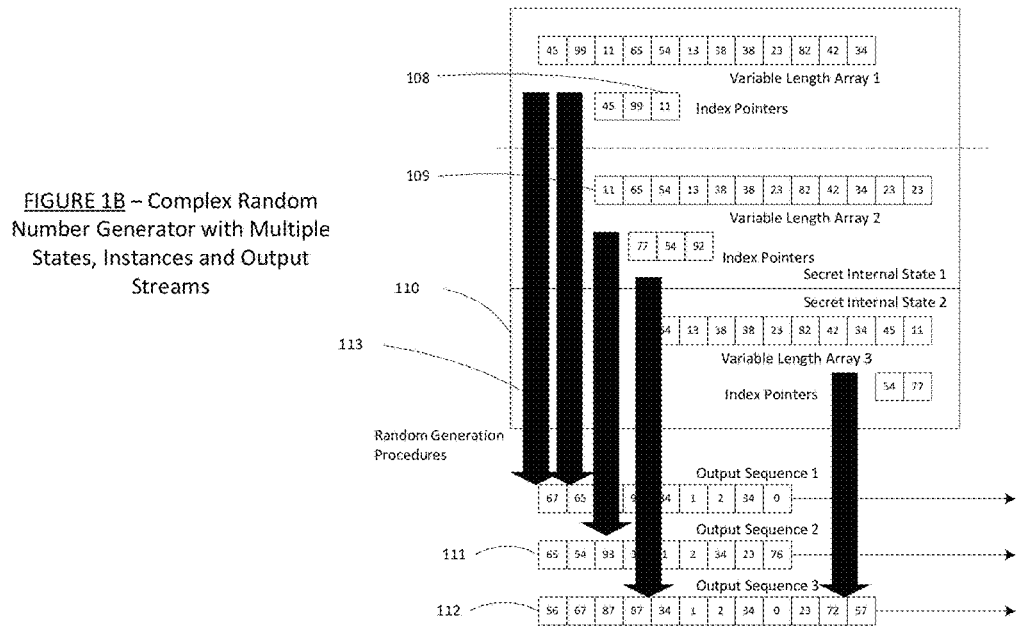

Some embodiments described herein are associated with "encryption" and "decryption". As used herein, the phrase "encryption" is the process of encoding or transforming messages or information in such a way that only authorized parties can transform it into a meaningful message. Encryption does not prevent interception, but denies the message content to the interceptor (as published by Goldreich, Oded "Foundations of Cryptography: Vol 2, Basic Applications. Vol. 2", Cambridge University Press, 2004). In an encryption scheme, the message or information, referred to as "plaintext" is encrypted using an encryption algorithm, producing "ciphertext" that can only be read if decrypted. For technical reasons, the security of encryption schemes are usually dependent on true random or pseudo-random encryption keys generated by an algorithm. It is in principle possible to decrypt the message without possessing the key, but, for a well-designed encryption scheme, even infinite resources, skill and time are insufficient to decrypt the message to a single correct message. Such a cryptosystem is said to have the characteristic of "ideal secrecy". In addition, "perfect secrecy" is a characteristic of a cryptosystem in that, given an encrypted message (or ciphertext) from a perfectly secure encryption system (or cipher), absolutely nothing about the unencrypted ciphertext (the plaintext) will be revealed in the ciphertext. Technically speaking, a cryptosystem has perfect secrecy if for any message "x" and any encipherment "y", $p(x/y)=p(x)$. This implies that there must be for any message/cipher pair, at least one key which connects them.

Some embodiments described herein are associated with a "network entity", "system entity" or "entity". As used herein, the phrases "network entity", "system entity" or "entity" may be used interchangeably and may refer to any physical or logical component or element of the cryptosystem that uses, interacts with or constitutes said cryptosystem and which can be separately identified and authenticated using an identification number sequence. Examples of entities include but are not limited to users, machines, groups, enterprises, authorities, services, ports, keys, RNGs, entropy sequences, programs, addresses, tokens, devices, systems, configurations, components, nodes, instances, states, identifier types, ciphers, keystreams and data streams. Entities may comprise one or more other entities.

Some embodiments described herein are associated with a "network node" or "communication node". As used herein, the phrases "network node" or "communication node" may be used interchangeably and may refer to any physical or logical device that can communicate via a network, to another network node, or to itself, or to another network component within the same network node. Examples of network nodes include a Personal Computer (PC), a workstation, a server, a printer, a scanner, a facsimile machine, a copier, a Personal Digital Assistant (PDA), a storage device (e.g., a disk drive), a hub, a router, a switch, and a communication device (e.g., a modem, a wireless phone, etc.). Network nodes may comprise one or more network components. As used herein, the term "network component" may refer to a network device, or a component, piece, portion, or combination of network nodes. Examples of network components may include a Static Random Access Memory (SRAM) device or module, a processor, and a communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of packets, sequences, signals, and/or other forms of information between and/or within one or more network devices. Networks may be constituted of, or include a plurality of interconnected network devices. In some embodiments, networks may be virtual, neural, artificial, hard-wired, wireless, and/or of any other configuration and/or type that is or may become known. Communication networks may include, for example, one or more networks configured to operate in accordance with the Ethernet LAN transmission standards published by the Institute of Electrical and Electronics Engineers (IEEE).

Further, some embodiments herein are associated with "data" or "information". As used herein, the terms "data" or "information" may be used interchangeably and may refer to any individual or combination of sequence, numbers, data, text, voice, video, image, message, bit, byte, packet, package, pulse, tone, waveform, and/or other type or configuration of signal and/or information. Information may be or include information packets, network management information, cryptosystem control information, datagrams, or cryptograms transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encrypted, checked for errors, certified, and/or otherwise packaged or manipulated in accordance with any method that is or becomes known.

Some embodiments described herein are associated with "information indicative of" or "indicia" of information associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information.

In addition, some embodiments are associated with the protection, encryption and utilization of information against "risk" or "security risk". As used herein, the term "risk" or "security risk" may generally refer to any probability, possibility, chance, and/or likelihood of incurring an event of negative consequence such as encountering peril, loss, hazard, danger, and/or injury. In some embodiments, "security risk" or "risk" may refer to any actual, perceived, inherent, intrinsic, and/or other form or type of peril, loss, hazard, danger, and/or injury. According to some embodiments, "security risk" or "risk" may refer to any individual, item, device, event, agent, organization, and/or other object or entity that may contribute to, cause, result from, and/or otherwise be associated with any type or form of risk. Risk may, according to some embodiments, be associated with any type and/or aspect of possibility of peril, loss, hazard, danger, and/or injury. Examples of risk may include, but are not limited to, financial risk, political risk, risk of injury, risk of theft, risk of damage, risk of terrorism, risk to reputation, regulatory risk, legal risk, war risk, and environmental risk.

Upon reading this disclosure, those skilled in the art will recognize that embodiments of the present invention may be used to encrypt, decrypt, authorise, authenticate, verify, repudiate, propagate, alter and any number of different types of information.

SUMMARY OF THE INVENTION

The following descriptions of embodiments, some of which are preferred, are provided for further illustrating, but not limiting, the present invention.

To alleviate the problems inherent in prior art, embodiments provide systems, methods, apparatus and means for random number generation, encryption, decryption, super-encryption, super-decryption, authentication, message packet construction and message verification. The applicants have recognized that there is a need for separate systems, methods, apparatus and means for addressing specific cryptographic problems, and a need for the integration of those separate systems, methods apparatus and means to be used in unison to create a fully integrated cryptosystem which strives to attain the security characteristics of "perfect secrecy", or "ideal secrecy.

One benefit of some embodiments is that the cryptographic security of encryption through the use of multiple random and perpetual keystream sources, addresses a number of issues with current computer security implementations in one comprehensive solution. As a result, users such as financial institutions, businesses, government agencies, or the like may be afforded a greater level of security in protecting their digital assets, such as files, data, network communications, in perpetuity. Some embodiments provide benefits such as the ability to perform a number of cryptographic functions, such as unilateral initiation of communication, encryption to local media, encryption over a network, authentication, verification, digital signing, hashing, broadcasting, automated key management, stream auto correction, and others all using a single cryptographic algorithm or cipher. Other features and advantages that are derived from some embodiments will become apparent upon reading this disclosure.

Individual Cryptographic System Components

Certain embodiments of the current invention include, but are not limited to the use of a number of separate components, modules, methods, systems, apparatus and means which may in themselves be considered separate inventions. The separate methods, systems, apparatus or means which will be discussed include: (a) an random number generation method or system used within random number generators having variable and random internal states, to produce random number sequences (b) a method or system of deploying multiple independent random number generation sources in various configurations using a hierarchy, making them conducive to another mechanism detailed below which allows for the generation of unpredictable random number sequences using pseudo-random number generators (c) a fast, simple and efficient super-encryption method or system using two or more ciphers, and one or more keystreams, which is brute force resistant, (d) a message packaging method or system for the transmission of data and additional random entropy sequences using communication links, (e) a method or system of using the additional entropy information to alter the dynamics of the cryptosystem at various levels, (f) a method or system for the distribution of initial keys or sequences to initialize secure communication links between network nodes using simple delivery, by integrating asymmetric encryption components within the super-encrypted cryptogram (g) a method or system of centrally registering cryptosystem entities (users, machines, keys, algorithms, devices etc.), (h) a method or system of exchanging, distributing and protecting initialization keys or sequences between cryptosystem entities.

Random Number Generation

Certain embodiments of the current invention include, but are not limited to the use of a distinct and unique random number generation method or mechanism called "Hi-Generate" which can be used with PRNGs which use secret internal states to generate a pseudorandom or random stream of values in bits or bytes. Whilst PRNG's used may use internal secret states of any length, the Hi-Generate method requires these states to be composed of random numbers and not a uniform random distribution of unique numbers as is encountered with ARC4, a popular stream cipher.

Like any stream cipher the sequence of random numbers produced by a Hi-Generator can be used as a keystream for encryption purposes by combining it with plaintext using a bit-wise exclusive-or (XOR), or logical operation, with decryption being performed using a similar operation with XORs (since XOR with given data entails an involution), or by reversing the logical operation. To this end it is similar to the "one-time" pad with the exception that a generated stream of pseudorandom bits, rather than a readily available pad, is used. The output random stream sequence of numbers can also be used to great advantage for a number of alternative purposes under specific conditions which will be become apparent as we discuss the invention in more detail.

With reference to FIG. 1, a diagram which illustrates the internal composition of a basic Hi-Generator configuration in FIG. 1A, and a complex Hi-Generator configuration in FIG. 1B, we see that in order to generate a keystream 101, Hi-Generators use a secret internal state 102 comprising a variable or fixed length array 103, which may be populated with a sequence of random 8-bit numbers or bytes, and has at least two or more index pointers per state array 104, 105, 106. Unlike some stream ciphers, the main state array does not need to be 256 bytes in length or require a permutation of all 256 possible 8-bit values. The output sequence is generated using a procedure 107 which uses the changing values in index pointers to select values in the array which are selected as outputs, and will result in random changes to those array values as a result of that procedure.

A Hi-Generator may take many different configurations which may include additional 8-bit or other bit-sized index pointers 108 per state array, or additional internal state arrays 109 with associated index pointers for each state array, or even additional independent Hi-Generator secret states 110, containing their own separate state arrays and index pointers. In addition, additional random number outputs 111, 112, can be derived from multiple arrays within a secret state, from multiple secret states within a generator, or multiple output bytes can be derived from a single state 113. Since state array lengths may easily exceed 256 characters, index pointers may be 16-bits in size or larger where this is the case. There are usually at least two index pointers per array, but in some embodiments, three or more may be deployed.

Figure 2:
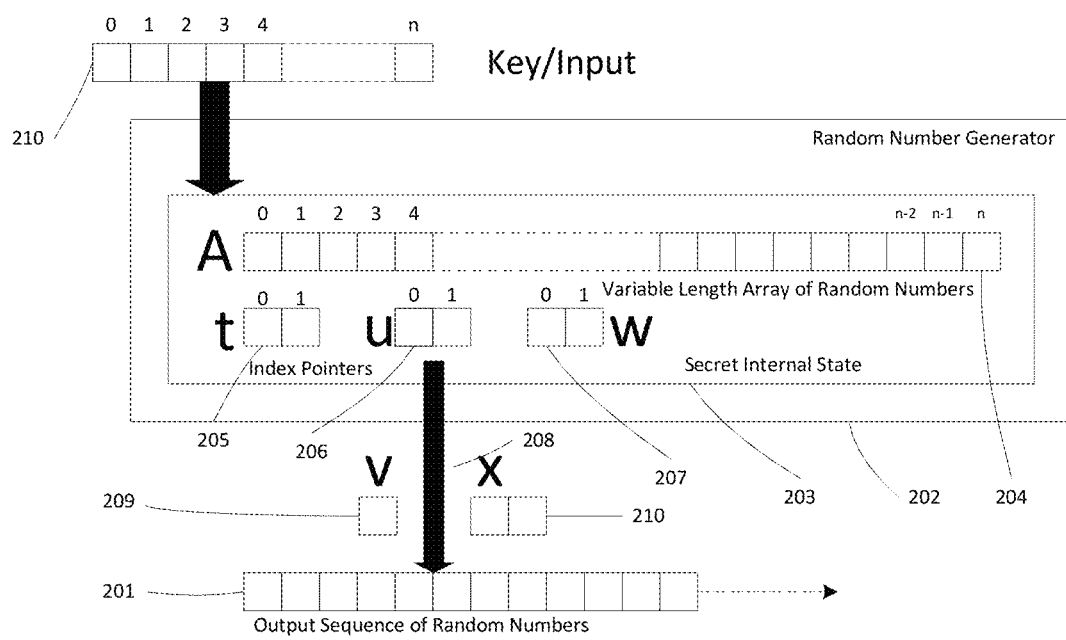
FIG. 2 is a component diagram illustrating the internal components of a random number generator in detail, as contemplated by the invention.

In describing the general internal mechanics of a Hi-Generate RNG, such as initialization, or internal operations of a permutation, we may use a basic example such as that shown in FIG. 2A where a single Hi-Generator 202, with a single secret internal state 203, composed of a single array 204 of indeterminate length "n" bytes containing a random or predetermined sequence of numbers, two single or multiple byte index pointers we shall refer to as "t" 205 and "u" 206, and an output called "v" 209. An additional index pointer "w" 207 and an additional output "x" 210 is also shown. The additional index pointer may be used with an additional index pointer or existing index pointers to operate on the same or a distinct section of the array to produce the independent output value.

The initialization process of a Hi-Generator or other RNG may take many forms and generally entails a fixed starting configuration of the RNG prior to commencing random number generation. Certain embodiments of the current invention include but are not limited to deployments where the initial composition of RNGs is established using a predetermined, provided, fixed or random sequence which may be numbers, data or any other type of information, such as a key Such a process may designate the number of state arrays, appropriately sized index pointers, their relationships, and their respective content with regard to values. Generators may therefore be initialized with any randomly determined or predetermined length, and appropriately sized index pointers, and can simply be initialized by filling any arrays or index pointers with the provided random or predetermined number sequences. Where provided sequences are shorter in length than array A such as with a key, simply repeating the sequence ad nauseum should suffice. Alternatively, the content of another generator may be used, with or without a transformation.

It is important to make a distinction at this stage between synchronized and unsynchronized RNGs. Whilst both unsynchronized and synchronized RNGs may share all or a portion of internal information with other RNGs, unsynchronized RNGs do not produce or intend to produce identical sequences with other RNGs. Synchronized RNGS use the content of another RNG, without a transformation, such that the sequence of random numbers may be identical, allowing for encryption by a sender and decryption by one or more receivers. Hi-Generators or any other PRNGs for that matter, require that the sender and receiver Hi-Generator or RNG configurations be perfectly synchronized in composition and array values. Unsynchronized RNGs on the other hand operate independently. Whilst this invention provides for additional secure means and methods of initializing synchronizing RNGs, which will be discussed later, we will simply state at this point that the sending generator has communicated the details of an identical Hi-Generator or RNG configuration to the receiving station and with reference to FIG. 2. that both parties share the variable length key 210 of "n" bytes (which may contain the internal state values to be inserted into the synchronized RNGs). Certain embodiments of the current invention include, but are not limited to situations where RNGs are synchronized in a manner where the parties may simply XOR, or perform a logical operation, or an encryption operation with the values of the variable length key (or any other data sequence) with the existing values in the respective A array or arrays. It is of importance to note at this point that the security behind Hi-Generate random number generation does not depend entirely or primarily on the initial seed key values being secret, and they may even be made public, but also on an additional entropy distribution mechanism which may address that requirement. Unsynchronized Hi-Generate RNGs may best be initialized using the random output of one or more other RNGs, which may be true or pseudo RNGs.

Figure 3:
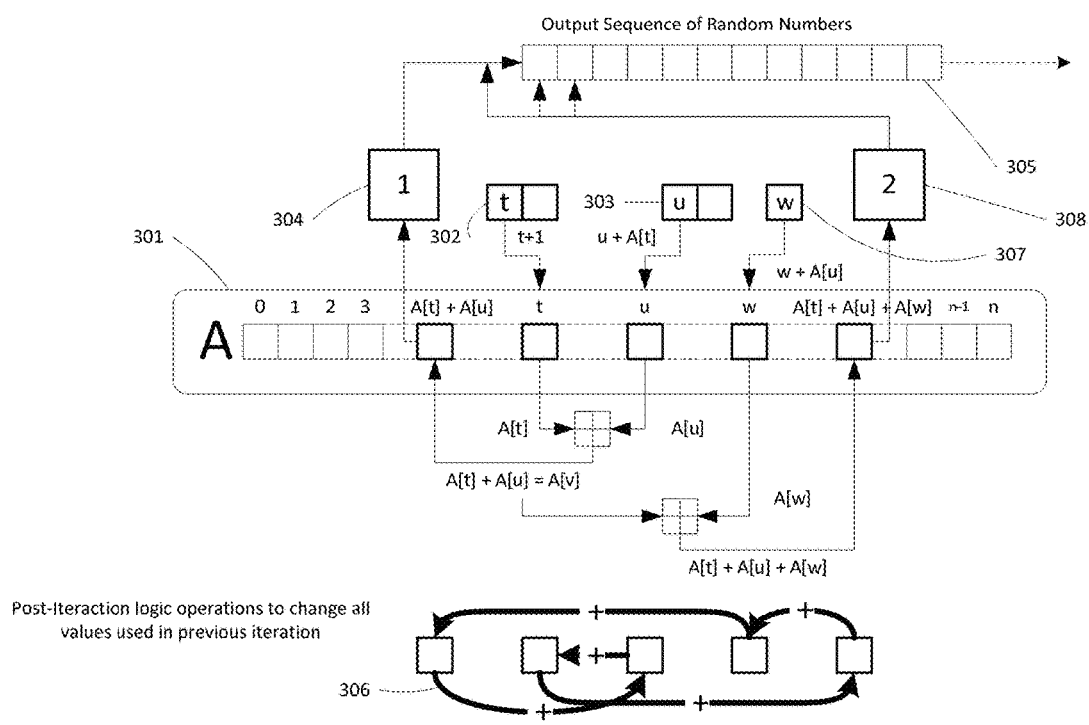
FIG. 3 is a diagram illustrating the internal mechanics of the random number generation process as contemplated by the invention.

Certain embodiments of the current invention include, but are not limited to the random number generation of single values (which may be of any bit size) per generator iteration and may generate multiple values per iteration to one or more output sequences. With reference to FIG. 3 which demonstrates the basic internal mechanics of the Hi-Generate random number generation procedure we have a single array "A" 301 with "n" byte values and two index pointers "t" 302 and "u" 303 with 2 byte values each and an output sequence called "v" 304 which may be a value of any bit size. For as many iterations as are required to produce a single output value (single value output mode), the Hi-Generator pseudo-random number generation algorithm uses index pointers to identify locations in the array, from which values may be obtained to change index pointers, to ultimately obtain one or more array locations from which values may be used as outputs to the keystream or output random sequence 305. Any array location which has been active during the iteration may have its values amended prior to the next iteration. Therefore with every iteration, the Hi-Generator algorithm may increment the "t" value by 1 (modulo the length of the A array), ensuring that all array locations are interacted with, locates the value A[t] and adds that value to the existing "u" value (modulo the length of the A array) to get the second location A[u]. The addition of A[t] and A[u] (modulo the length of the array) may point to a third location A[v] from which the "output 1" byte value 304 may be extracted directly or subject to a transformation prior to being added to the output. To complete the procedure, whilst some RNGs only exchange specific locations, it may be preferable to change the values at specific, all or a combination of locations 306, using mathematical operations such as addition or subtraction. In the case of addition, the value of A[t] may be incremented by A[u](modulo 256), A[u] may be incremented by A[v] (modulo 256) and A[v] may be incremented by A[t]. Subtractive mathematics may involve reducing the values instead of adding them. Of primary importance though, is the fact that the above operations do not hinder but aid the ability of Hi-Generators to receive and output values directly from and into random locations of their internal states (including index pointers and arrays).

The pseudo code for single value generation over one iteration is:

```
k := length of array to be processed
t := 0
u := 0
v := 0 : output location
while ProduceOutput:
    t := (t + 1) mod k
    u := (u + A[t]) mod k
    v := (A[t] + A[u]) mod k
    output A[v] : first value
    S[t] = S[t] + S[u] mod 256 or other number
    S[u] = S[u] + S[v] mod 256 or other number
    S[v] = S[v] + S[t] mod 256 or other number
endwhile
```

Certain embodiments of the current invention include, but are not limited to the random number generation of multiple output values per generator iteration. With regards to the specific mechanics of the Hi-Generator method for multiple value outputs we see from FIG. 3 that there is an additional index pointer "w" 307 and an additional "output 2" value 308. The additional byte can either be extracted in a similar manner to that used with single byte extraction, substituting the "w" value for "u", using the same array, different sections of the same array, different arrays. Alternatively, in order to process the second byte value, there are a number of options (a) the value of "u" can be added to the existing "w" value (modulo the length of the array) to point to a location A[x] from which the additional value is placed on the outbound sequence (b) the value of A[u] can be added to the existing "w" value (modulo the length of the array) to point to a location A[x] from which the additional value may be placed on the outbound sequence, (c) or the values of A[t]+A[u] can be added to "w" (modulo the length of the array) (as shown in the FIG. 3.) to point to a location A[x] from which the additional value may be placed on the outbound sequence. Additional outputs can be accommodated by adding additional index pointers and extending the number generation sequence in a similar manner to that described above. Alternatively, in the example above, output values such as A[x] may be used to refer to other locations in the array, such as A[A[x]] from which values are extracted, or the values of A[x] and A[A[x]] may be added to produce an output, or A[x] may be added to any other location or value obtained during the generation iteration and then presented as a RNG output value.

The pseudo code for multiple output number generation over one iteration is:

```
k := size of state to be processed
t := 0
u := 0
v := 0: first output location variable
w := 0
x := 0 : second output location variable
while ProduceOutput:
    t := (t + 1) mod k
    u := (u + A[t]) mod k
    v := (A[t] + A[u]) mod k
    output A[v] : first value
    w := (w + u) mod k ‖ w := (w + A[u]) mod k ‖ w := (w + (A[t] + A[u])) mod k
    x := (u + A[w]) mod k ‖ x := (A[u] + A[w]) mod k ‖ x := ((A[t] + A[u]) + A[w]) mod k
    output A[x] : second value
    S[t] = S[t] + S[u] mod 256
    S[u] = S[u] + S[v] mod 256
    S[v] = S[v] + S[w] mod 256
    S[w] = S[w] + S[x] mod 256
    S[x] = S[x] + S[t] mod 256
endwhile
```

Alternatively, in order to increase parallelism, single or multiple output sequences can be provided by using multiple single-value or multi-value modes of operation with a Hi-Generator, or multiple Hi-Generators. A Hi-Generator is in essence an autonomous software or hardware unit that is used to produce random numbers. Hi-Generators may be internally composed of one or more secret internal states, each having its own array, index pointer, and output configuration. A number of Hi-Generators running at a specific logical or physical location may also be grouped together as an autonomous unit and can be referred to as a RNG node or Hi-Generator node. Hi-Generate mechanics can be applied to other RNGs, provided they have large internal states with random values.

In addition, it may be possible to synchronously or asynchronously apply multiple Hi-Generate random number generation procedures simultaneously to the same state array, and still produce separate random number sequences. Alternatively, in order to avoid collisions, a large state array may be segregated into sections which may be of variable length with one or more random number procedures being uniquely or in combination be applied to one or more sections.

Figure 4:
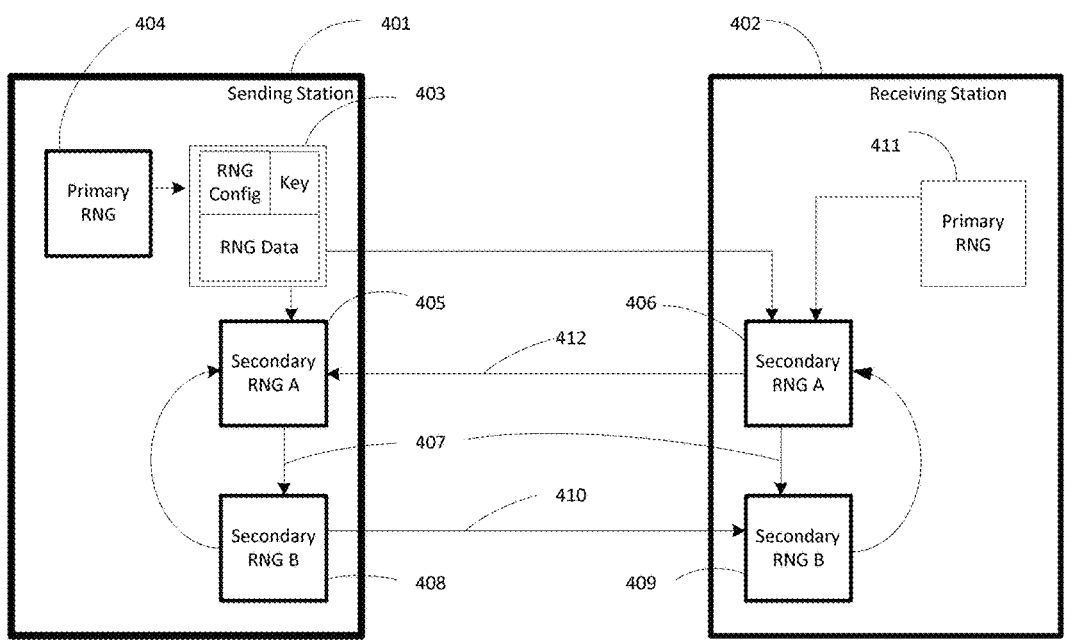
FIG. 4 is a functional block diagram illustrating an initialisation process and capabilities which embody the invention.

Certain embodiments of the current invention include, but are not limited to where a sender and a receiver on opposite ends of a communication link may use multiple Hi-Generators to initiate communications. The sender and the receiver may use an initialization process which may entail the use, interaction or combination of and between two or more Hi-Generators or RNG sources, each of which may consist of one or more RNG arrays, secret states, instances or nodes. From FIG. 4, a diagram illustrating such an initialization process initiated by a sending station 401 and a receiving station 402, an initialization package 403 is created by a Primary RNG 404. The initialization package being comprised of RNG configuration information, a key, and RNG data values. The sending station transmits the package to the receiving station. The package is then used by the sender and the receiver to configure identical secondary RNGs 405 and 406 at their respective locations, which are designated as RNG A at both locations. A secure means may be used to transmit the key which may be of any length. The primary RNGs at both locations remain unsynchronized with each other, since they are responsible for generating any unique keystreams required by secondary RNGs. Both sender and receiver may configure their respective Secondary RNG A arrays with the RNG Configuration specifications in the initialisation package or use a predetermined configuration. The RNG A arrays and index pointers may then be populated with the RNG data contained in the initialisation package directly, or may be populated in a manner which is determined by specific characteristics of the key or a portion of the key. Index pointers may be populated directly with the bytes from the key or an operation, or a function calculated from a characteristic of the key, such as the numerical differences between byte values. Secondary RNG As at both stations may then be able to produce a sequence of outputs 407 on the basis of the previous state and use the random sequences in a similar manner to the initialization package to configure and populate their respective Secondary RNG B random number generators 408, 409. A predetermined characteristic of the key may again be used during the population of RNG B at both locations to transform the content or any other aspect of the sequence of random values which was used to instantiate RNG B. Alternatively, once the Secondary RNG A generators are synchronized, the primary RNG at the receiver 411 may create a random sequence which may be used as an initialisation package, transmitted across the encrypted communication link 412 between RNG A generators. The package may then be used to instantiate and initialize the RNG B generators. The RNG B generators may therefore be synchronized through packages created by station 1 or station 2 primary RNGs. Following that, for additional security, either the sender or the receiver may use their RNG B generators to transmit another initialisation package along a secured communication link 410 to the other party, where it may be used to reinitialise RNG A generators, or any other RNG generator.

The key may be applied literally to any other initialisation package or additional key, or it may be used to introduce random effects on RNG mechanics, such as altering specific values in RNG states, or entail counts where data is continually applied to the internal state, arrays or index pointers of an RNG during initialisation until a predetermined insertion or output count is attained. In addition, the input or output sequences to and from any initialized or uninitialised generator may be intermittently interrupted during initial communication sessions, or during initialization activities, using a predetermined characteristic of the key or a function of the key. For example, it may miss 20 values, output 34, then miss 200, then output 7, etc. until RNGs are fully populated or a predetermined count is reached. After that point, the respective RNG may be synchronized with its counterpart and output may be used to initiate secure communication using RNG keystreams, or additional initialisation activities, or both In addition, the process can be reversed, using a predetermined instance configuration, after RNG B has been initialized, to reinitialize RNG a generators in a similar manner, in order to have one or more additional arrays initialized and synchronized with another Hi-Generate instance. Thus it is possible to have a number of sending and receiving keystreams that have been intialised and synchronized with receiving and sending keystreams of another Hi-Generator at the other end of a secure communication link.

In addition, the above initialisation process may be used to initialize multiple Hi-Gen instances, or further, to initialize Hi-Gen nodes and maintain synchronicity with other Hi-Generate instance and nodes, prior to initiating keystreams.

In addition, the process mentioned above can be used to prepopulate backup Hi-Generators or their respective internal states, in case of communication errors in a secure communication link. For instance, once RNG B generators at both locations have been initialized, RNG A generators may have their internal secret states saved prior to reinitialisation, with or without an advancement count. An advancement count allows an RNG to produce output sequences intermittently, in that specific values or value ranges from the output of an RNG may be included or excluded from the output stream of random numbers, dependent on a predetermined characteristic of the key, or the initialisation package.

In addition, once the first initialization package has been processed and a secure communication link has been established between the secondary RNG A generators at both locations, any RNG at both locations may be used to generate a new initialisation package which can then be appropriately deployed at both locations on any existing RNG or any newly deployed RNG, and this initialisation process can be repeated ad nauseum until any predetermined characteristic has been satisfied.

Random Number Generator Updates and Feedback

Certain embodiments of the current invention include, but are not limited to situations where multiple RNGs having various configurations and internal secret states may randomly or intermittently exchange entropy between each other, which may be used to great advantage to introduce random and unknown characteristics and impacts into the random number production mechanics resulting in unpredictable random number sequences being generated using pseudo-random number generators.

Considering the situation of three RNGs, it may be possible for a first RNG to produce a random sequence, which may then be encrypted or processed with the random sequence of the second RNG. The resultant random number sequence (in effect a ciphertext) may be used as a random sequence in its own right, or it may be transmitted to another third RNG which has been synchronized with the second RNG and decrypted, making the initial random sequence produced by the first RNG available at the location of the third RNG. The available random sequence may then be used to effect changes amongst other RNGs at the third RNGs location.

In the case of two simple RNGs with any number of internal secret states, arrays and associated pointers, a first (or primary) RNG may be used, under predetermined or random conditions, or following a predetermined characteristic of a generated output sequence of numbers, to interfere with the internal secret state (arrays, index pointers, configuration and values) of another second (or secondary) RNG by updating or altering predetermined or random sections of specific or randomly selected internal secret state components, with the mentioned generated output sequence. The scope of the updates or alterations includes the selection of RNGs, and alterations or updates may be determined by predetermined characteristics of the output sequence, such as determining the order of arrays to be updated using a byte from the output sequence and applying a modulus of the number of arrays. In addition, the specific updates or alterations which may be effected, may be predetermined, or may be derived from byte values in the output sequence, for example the $2^{nd}$ $3^{rd}$ and $4^{th}$ byte may replace some or all index counters, the $5^{th}$ byte may indicate a start position for the update in the array for the length of the output, or the $6^{th}$ byte may indicate the end index position of the subsequent bytes to be applied. Changes, updates and alterations may be applied to the designated RNGs internal state arrays and index pointers directly, using a function or transformation, or through encryption with a secret key. In addition, alterations and changes may have feedback or feed-forward effects in that affected or updated values in the second RNG's state, arrays or index pointers may be extracted prior to being amended and be sent back to the first RNG, or be forwarded to another RNG which may be local or remote. This forward update and feedback process may also be subject to weighted conditions of the input, resulting in a rudimentary implementation of an artificial neural random number generation network. This update, feedback and feedforward procedure may be initiated by any RNG, through any RNG, to any RNG.

With a view to an artificial neural RNG network, in order to avoid the problem of convergence (which is wholly unwanted in a random number generator and entails a biased trend in the reduction of entropy in the network), and step beyond pseudorandom number generation into the realm of true random number generation, it is necessary that the composition, timing, or means of application of the update, is subject to some random unpredictable interference (entropy) originating from an external true random source, such as user keyboard timings, network timings, noise channels etc. Since update and feedback routines may also occur between any combination of state arrays, instances or nodes, another means by which one can guard against the artificial neural network "convergence" problem, is to ensure that random number generators are deployed using a one-to-many hierarchy of primary to secondary generators. Primary RNGs serve as rendezvous points for feedback or feedforward updates from secondary RNGs. From a scalability perspective, multiple primary RNGs may be deployed with a master RNG above them. Primary RNGs are sources for update propagation down to secondary RNGs which may transfer updates to other network node secondary RNGs, which may then be propagated as feedforward up to their primary RNGs. In this manner, small updates which implement random changes to RNG internal states may result in mass propagation throughout the network. Having additional true random sources of entropy on even a single network node should be sufficient to prevent convergence throughout the network, considering that amount of propagation which may take place in a cryptosystem.

In addition, since secondary RNGs may receive updates from local primary RNGs and transfer these updates across the network to remote secondary RNGs, the updates may be applied to the local secondary RNG immediately after transmission and to the remote secondary RNGs immediately after receipt and decryption, in order to maintain a synchronized secure communication link. Updates to local secondary RNGs may result in feedback changes being pushed back to local primary RNGs, identical updates to remote synchronized secondary RNGs may result in identical feedforward updates being applied to remote primary RNGs. Whilst remote and local primary RNGs may receive similar feedback/feedforward updates, their existing internal states may be different resulting in updates having different impacts. For this reason, updates should be applied using an index retrieved from the primary RNG. In order to avoid convergence, the update point of the target RNG array—let's call it A[i]—may be determined by a predetermined characteristic of the update sequence. A logical operation on the value of "A[i]" and "I" (modular the size of the target array) may be used to determine the actual insertion point of the feedback/feedforward update.

Figure 5:
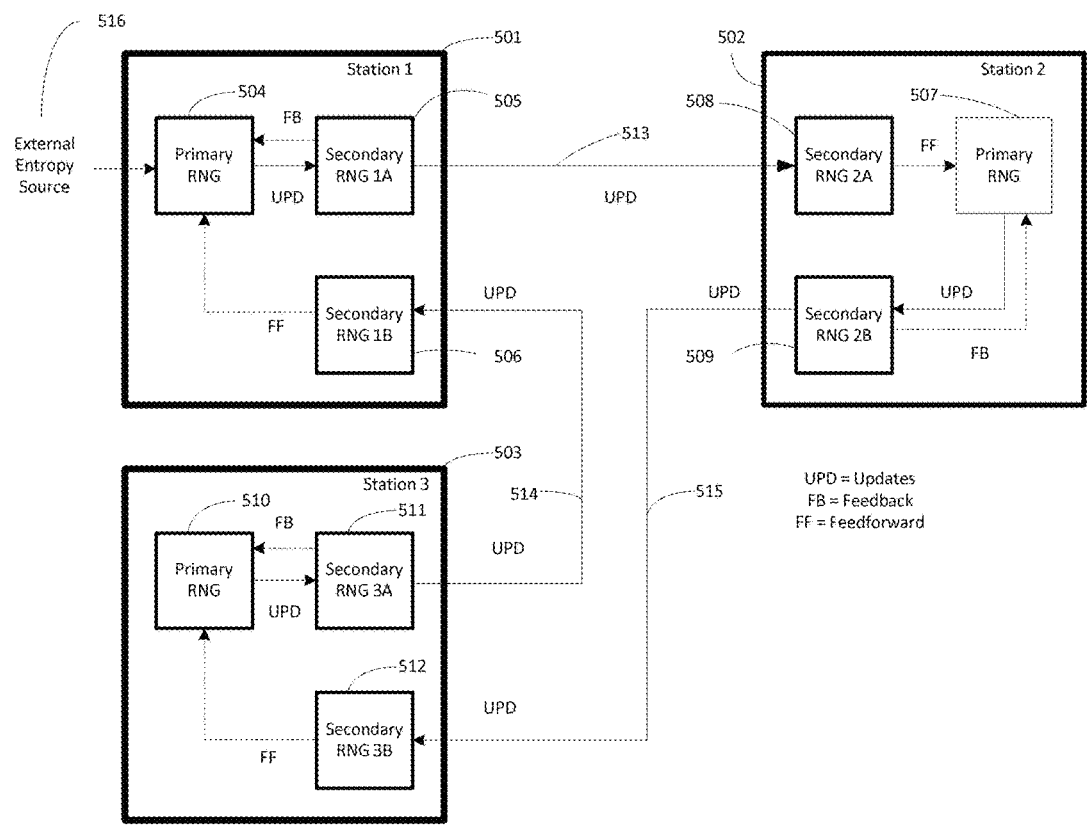
FIG. 5 is a functional block diagram illustrating the random entropy update propagation method which embody the invention.

FIG. 5 demonstrates the flow of forward, feedback and feedforward update flows within a network of three network nodes or stations 501, 502 and 503, each populated with a single primary RNG, 504, 507 and 510, and two secondary and synchronized RNGs each (505, 506, 508, 509, 511, 512). Each station is connected to the other two via communication links 513, 514, 515 which terminate at a secondary RNG. Updates start at a primary RNG such as 504, and are sent to a secondary RNG 505. Once encrypted and transferred over a communication link 513 to a remote secondary RNG 508, the update is applied to the local secondary RNG 505, which leads to a feedback update being returned to the primary RNG 504. The application of the update at the remote secondary RNG 508 may result in a feedforward update being forwarded to the remote primary RNG 507. This process is repeated on the other communication links 514, 515. A single external entropy source 516 may be sufficient to convert the entire network into a true random generation network.

As can be seen, update impacts eventually propagate to the entire network since they are escalated up the RNG hierarchy of other systems, introducing new entropy into the primary RNGs, which then propagate downward again and are transferred to other systems. This mechanism ensures that the impact to random number generation sequences from a single update sequence eventually permeates throughout the entire network, and continues to do so long after the initial update sending station has been closed down.

Entropy Injection

Certain embodiments of the current invention include, but are not limited to embodiments where random number updates and feedback to and from generators as mentioned above may serve as a means of introducing additional entropy into the random number generation process of other RNGs and therefore into the encryption process itself. From FIG. 5 we see an example of such an embodiment, where a sending station 501 is connected to a receiving station 502 via a secure encrypted communication link 513 and said communication link is encrypted using the output of a secondary generator RNG-1A 505 at the sender which is synchronized with the secondary generator RNG-2A 508 at the receiver. A random update sequence produced by station 1's primary RNG 504 may be encrypted like any other data with the keystream from station 1's secondary RNG-1A 505 and transmitted over the communication link to the receiving station, where the remote secondary generator RNG-2A 508 is able to decrypt the cipher-stream and extract the random update. Following encryption and transmission, the random sequence update may be applied locally to any random number generator, but specifically to RNG-1A altering its internal secret state. In a similar manner, following receipt and decryption at the receiving station, the random sequence update may be applied to the synchronized RNG- 2A altering its internal state in an identical manner. The random sequence update may be applied at a predetermined time, immediately after reception, or at a time determined by a characteristic of the update or other control information which may be transmitted along with the random sequence update. At the sending station, impacts flowing out of the application of the random sequence update to RNG-1A may result in a feedback update being returned to the primary RNG generator at the sender. In a similar manner at the receiving station, an identical feedforward update may be sent from RNG-2A to station 2's primary RNG generator. The impacts of the update may lead to further upward feedback updates at both stations.

In a similar manner, it is possible to combine random number sequence updates from one or more random number generator sources and transfer them to one or more random number generator destinations. The means, manner and method in which random number sequences may be combined may be predetermined by cryptosystem configuration, or by predetermined characteristics of the update information being transferred, or predetermined by characteristics of the originating RNGs and destination RNGs of the random entropy update information. For example, it may be that separate random number updates from a primary RNG (update 1) and secondary PRNG (update 2) at station 1 may be appended (update 1-update 2) or multiplexed prior to transmission to a primary RNG and secondary RNG at station2, where upon receipt they (update 1-update 2) are split or de-multiplexed. Following transmission, "update 1" may be applied to the secondary RNG at station 1, upon receipt at station 2 it may be also applied to the secondary RNG at station 2. Upon receipt at station 1, "update 2" may be applied to the primary RNG at station 2. Alternatively, entropy update(s) originating at one or more RNG(s) may be transmitted in any form and be applied to one or more other RNG(s), in whole or in part, or in combination with any other data or information.

Entropy Encryption and Transfer

Certain embodiments of the current invention include, but are not limited to embodiments where random entropy updates are encrypted or super-encrypted before being transmitted to a destination. This may include scenarios where one or more random entropy updates or keystreams originating from two or more RNGs are encrypted or super-encrypted with one or more keystreams from the same RNGs, or one or more keystreams from two or more other RNGs. With FIG. 6 we see a diagram demonstrating how such an entropy encryption, transfer and application process may be applied. Two stations, a Sender Station 601 and a Receiver Station 602 are connected using a Communication Link 603. The Sender Station being composed of a Data Source 604, a Data Multiplexer 605, an Encryptor 606, and two RNGs, one of which is a Primary RNG 607 and the other a Secondary RNG 608. The Receiver station similarly being composed or two RNGs, one being a Primary RNG 609 and the other a Secondary RNG 610, a Data Destination 611, a Data Demultiplexer 612 and a Decryptor 613. The Secondary RNGs at both stations being synchronized and responsible for supplying identical keystreams 624 and 625 to their respective Encryptors or Decryptors which ensure that the Communication Link between both stations is secure. The initialisation process of the two Secondary RNGs may be initiated by the sender's Primary RNG 607 in producing 614 an Initialisation Package 615 which may contain RNG Configuration data, RNG value data and the Key. The Key and the rest of the package may be transmitted 616 and 617 to both secondary RNGs using a secure channel. Alternatively, only the key requires a secure channel for distribution to both secondary RNGs. Following initialization of the Secondary RNGs at both locations, they may be synchronized, and the communication link itself may be secure. From an external source at the sender 618, data may arrive at the Data Source 604 and a predetermined portion of that data waiting to be transmitted may be sent 619 to the Data Multiplexer 605. The Data Multiplexer may also require a predetermined portion of the keystream or keystreams of the sender's primary RNG to be sent 620 to it. The keystream may be used by the Data Multiplexer to construct a new update sequence. The Data Multiplexer may then construct a message package using the data and/or the update (or its transformation). The constructed message package may be transferred 621 to the Encryptor 606 which may then encrypt or super-encrypt the message package using a keystream provided 624 by the secondary RNG at the sender. Following transmission from the sender to the receiver, the update may be applied 622 to the secondary RNG at the sender by the Data Multiplexer, altering the secondary RNGs internal state in a random manner, and thereby also its subsequent keystreams. As a consequence of this, the Secondary RNG 608 at the sender may transmit 623 a feedback update (containing the replaced values of the secondary RNG or a function of its replaced values) to its Primary RNG 607, which in turn may alter its internal state. The primary RNG 607 may be subjected to multiple such feedback updates from the secondary RNGs which it serves. Following receipt via the communication channel 603 at the receiver station 602, of the encrypted message at the receiver's Decryptor 613, the receiver's Secondary RNG 610 may provide 625 the Decryptor with a keystream which may be used to decrypt or super-decrypt the received message. Once decrypted, the message package may be transmitted 626 to the Data Demuliplexer 612, which may then transfer data 627 to the Data Destination 611 (which may then be sent 628 to its final destination), and transfer the entropy update sequence 629 to the receiver's Secondary RNG 610. The application of identical updates to both Secondary RNGs may ensure synchronicity between the two, and thereby may ensure synchronized keystreams at both stations to encrypt and decrypt further cipher-texts. Similarly, the receiver's secondary RNG may issue a feedforward update 630 to the receiver's primary RNG 609, perpetuating the impacts of the initial update created by the sender's Primary RNG 607.

In this manner, entropy updates can be cascaded down the RNG hierarchy of a local or remote system, transmitted in an encrypted form, and be cascaded up the RNG hierarchy of another local or remote system. Thus, through a single efficient action, two synchronized RNGs can be synchronously subjected to a "random walk", and enable the propagation of an entropy update on another system as feedback. This encrypted entropy transfer also serves another advantageous purpose, in that the entropy updates can introduce considerable "cryptographic pollution" when encrypted entropy updates are combined with other data transmissions.

Encryption and Super-Encryption

Figure 7:
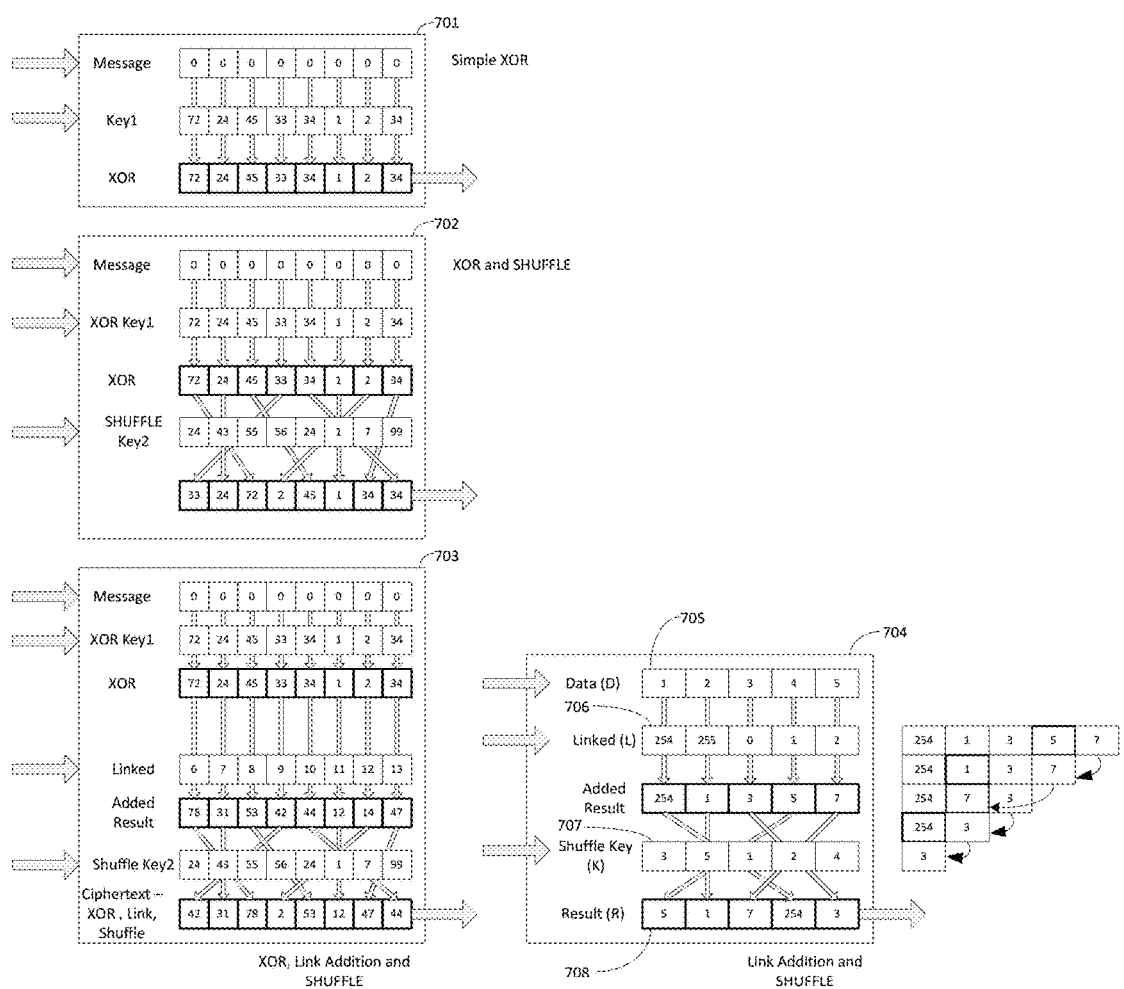
FIG. 7 is a diagrammatic illustration of various encryption and permutation methods as contemplated by the invention.

In order to achieve efficient super-encryption, two or more different encryption sequences must be used. Whilst it is possible to super-encrypt a message with a equal length keystream, encrypt the keystream with a block cipher using a short key, and combining both ciphertexts, this is inefficient, since it doubles the overall message length—100% overhead. Certain embodiments of the current invention include, but are not limited to embodiments where super-encryption can be attained with considerably less overhead than 100%. Since random entropy updates may be included with the data to be transmitted, and may be as large as the message, this is also not efficient. Whilst having the advantage of introducing additional entropy with every encryption cycle, increasing cryptographic strength, entropy updates of a fraction of the message size may be used, if they are applied at random to their destinations, using random numbers. In addition, whilst ciphertext may be transmitted in uniform length blocks from one station to another, the underlying message packages may be of random length, with randomly sized data and entropy update populations, and may be subject to random variations in encryption cycles. The current invention may use efficient deterministic encryption algorithms such as that shown in FIG. 7 where an XOR operation 701, combines bit values in a keystream with the message or plaintext stream. This has a disadvantage, in that the keystream becomes visible when XORing null messages. In addition it may also use simple additive or subtractive logic, or AND and OR operations as basic encryption algorithms. However, these linear operations introduce predictability into the identification of cipherstream constituents, and it is therefore necessary to introduce another efficient encryption algorithm called a Hi-Shuffle, which can be combined with an XOR or other algorithm 702 which shuffles the positions of the plaintext or the ciphertext on the basis of a provided keystream, from any one position of the input sequence to be encrypted to any one position of the output shuffled sequence. For maximum effect, a "linked" value or sequence of values from an additional number sequence may be used 703 and assigned to every value of the input sequence, and may be used to alter the numerical value of the first encryption sequence prior to it being encrypted with a another encryption algorithm such as a shuffle. The linked number values may be provided from another keystream, or may be predetermined on the basis of RNG configuration, a characteristic of any of the sequences provided for encryption, or any mathematical function of any such characteristics. The "linked" value may be added, subtracted, or be subjected to further encryption or mathematical functions before it is added to the encryption outbound shuffled sequence. The linked values may be 8-bit, 16-bit or any other bit variation and may start at a predetermined number such as 0, and be incremented by a predetermined number. Where sequences to be shuffled are larger than 256, then modulus arithmetic may be used where required. The basic mechanism for shuffling any sequence of numbers, may entail the three components—the data stream or message sequence, the key sequence, and the linked sequence. A value from the key sequence 707 may determine a location (modulus the length of the plaintext or datastream), on the data stream, the linked value and data value at that location may be added, subtracted or XOR'd and placed on the outbound sequence. To complete the sequence, the last value of the datastream may be placed in the vacated position, shortening the datastream by one. For example, looking at FIG. 7, in the shuffle example 704 we have a data sequence D 705 with values (1, 2, 3, 4, 5), a key sequence K 707 with values (3, 5, 1, 2, 4) a linked sequence L 706 starting at 254 and incremented by 1 with values (254, 255, 0, 1, 2), a result sequence R 708, and all sequence index values starting at [0]. K[0] is 3, pointing to D[3]=4 and L[3]=1 Adding D[3]+L[3] mod 256 results in 5, and the number 5 may be placed on the outbound sequence at R[0]. To complete the sequence, D[4] and L[4] may be moved to D[3] and [L3], such that D may have values (1, 2, 3, 5) and L may be (254, 255, 0, 2). To process the next output value for R[1], K[1]=5, pointing to position D[5 modulus 4]=D[1]=2, L[1]=255. D[1]+L[1]=(2+255) modulus 256=1. Therefore 1 may be added to the outbound sequence at R[1], and D[4] and L[4] may be moved to D[1] and L[1] to complete the sequence. Shuffling may be done in pairs or groups of D, L and K sequences. To decrypt a shuffling sequence, a reverse unshuffling process is applied, where the R sequence may be processed in reverse, with every subsequent R value being processed, inserted into the D sequence and moving the replaced D value to the end of the D sequence.

In accordance with another principal feature of the invention, the assembled message transmission package which may contain message, random numbers and cryptosystem management information may be encrypted using two or more independent and different encryption algorithms using the output of one or more RNGs, and decrypted in a reverse manner. Ideally, a value at a specific location in a plaintext should undergo a value and a location transposition, and thus the need for two or more ciphers during super-encryption. The overhead added to the packet is equal to the amount of random update material of random length that has been added to the message package, and should be usually between 0% and 25% for an average of 12.5%. In keeping with the principles of "perfect secrecy", the use of such a super-encryption mechanism, along with the use of a randomly determined message transmission package size which may have its last package size appropriately amended to appear as if it is using standard length processing blocks, may ensure that no information regarding the message, including whether a message was even transmitted, may be leaked to an assailant. Even in the event of an assailant being in possession of one or more known plaintext/ciphertext pairs, it may be considerably difficult, if not impossible for the assailant to reconstruct the underlying RNG states using a brute force approach, since updates may occupy entire message packages alone, and their impacts which may or may not affect future RNG outputs may eventually be erased completely.

Certain embodiments of the current invention include, but are not limited to embodiments where the encryption or super-encryption process used, which may be called "Hi-Encrypt", may use an XOR and a shuffle, or a combination of multiple XOR and shuffle encryption steps, using key sequences or portions of key sequences provided by separate or similar RNG keystream sources. In addition, when message or transmission packages (containing messages, RNG updates, control information and keys) exceed 700 bytes, there are more combinations of shuffling a sequence, than the information that can be contained in that sequence. In addition, when using large message package sizes in excess of 256 bytes, it may be feasible to use a single shuffle with 16-bit counters, or multiple shuffle encryption steps. XORs may be conducted before shuffles or vice versa. A combination of modular addition, subtraction, XORs and Hi-Shuffles may also be used in any viable combination, such as "Hi-Shuffle/XOR/Hi-Shuffle", or "Hi-Shuffle/XOR/XOR", or "Hi-Shuffle/Hi-Shuffle/XOR". Naturally, when decrypting, the algorithms are conducted in reverse.

Certain embodiments of the current invention include, but are not limited to embodiments where 2 or more parallel Hi-Encrypt encryption steps may be used to encrypt a sequence with an "XOR/Hi-Shuffle" mechanism, conducting the XOR first, followed by the Hi-Shuffle, or vice versa, and XORing and Hi-Shuffling the plaintext in one single step, using the 2 keystreams. Alternatively, 2 simultaneous XORs and a shuffle may be performed. The decryption procedure would be a logical reverse of operations.

Certain embodiments of the current invention include, but are not limited to embodiments where a Hi-Generate method of keystream generation and a Hi-Encrypt method of super-encryption results in no keys being stored on any system, keys being immediately used and destroyed, whilst eroding the underlying structures used to generate such a key. For the purposes of key destruction or destruction of sensitive data, the Hi-Generate and Hi-Encrypt process can be effectively used to rapidly erase or overwrite any sensitive information, using very large state arrays or RNG internal configurations (multiple variable interacting state arrays or instances).

An issue with current asymmetric encryption is that public keys are visible during transmission and can be immediately attacked. The encryption process can include the application of a Diffie-Hellman asymmetric encryption scheme, which is used to apply public/private key operations to the RNG updates themselves, within the shielded confines of the super-encrypted package. In order to exorcise man in the middle attacks, it is possible to use an interlink protocol, where parties send partial message updates to each other. Since initial communication packages are essentially acknowledgments, there is considerable empty space for large initial random updates. Following a predetermined synchronisation from a known initial PRNG state provided by the sender, any intermediary may be able to decrypt messages sent by sender, however, replies by the receiver may be more difficult to keep track of, since public asymmetric encryption may obscure the PRNG updates continuously. With sufficient initial synchronisation and random intermittent asymmetric operations, an adversary may quickly find himself overwhelmed by the computational mass increased exponentially by additional encrypted PRNG updates. The authentication mechanism essentially provides a better means of solving the distribution problem without revealing public keys. Additional elements may be included to incorporate a dynamic element to the Diffie-Hellman sequence, or to use it for specific multi-factor requirements which may present themselves over time in the future.

Certain embodiments of the current invention include, but are not limited to embodiments where random number updates or any other information, including encrypted crypto-streams or ciphertext may be advantageously subjected to a pre-encryption process, for example with asymmetrical encryption public keys and private keys, prior to being inserted into the main super-encryption process, as a means of inserting authentication, verification or key information within the protective confines of the super-encryption process, and allowing secure transfer until extraction from the crypto-stream and subsequent decryption via an asymmetric key at the receiving end. The use of such an asymmetric key pre-encryption sequence may have the advantage that a sender can transfer an initial RNG setup and one of a set of asymmetric keys to a receiver who sets up an identical RNG configuration. Whilst communication from sender to receiver may be trivial to decrypt, the reverse process from receiver to sender poses an ever increasing cryptographic problem. By way of an example with three parties, "Party A" (a sender at Station 1), "Party B" (a receiver at Station 2) and "Party I" (an intruder), we see that Party A may send Party B an initialisation sequence (composed of a sequence of random numbers, and a public key) which is intercepted by Party I. Whilst Party I may be able to easily decrypt any further messages sent by Party A to Party B based on the initialisation sequence which may be used to synchronise the receiver's RNG with the senders's RNG. However, Party B may initialize his RNG with the RNG update and initiate a series of RNG updates which are super-encrypted with the current state of his RNG and include update material encrypted with the public key, from his location to Party A's RNG. This may require Party I to break the public/private key sequence for every encryption cycle in order to access the update material for the next super-encrypted encryption cycle. This process can be repeated ad nauseum for a predetermined number of cycles. In addition, RNG updates may also include information which applies a portion of the RNG update and advances the RNG generator, before applying other portions.

In addition to inserting asymmetrically encrypted RNG update information into the Hi-Encrypt message package prior to super-encryption in order to initialize an RNG pair, Party A and Party B may also rely on a method to address man-in-the-middle attacks, by each party simultaneously sending the other an independent RNG update sequence, but splitting the asymmetrically encrypted RNG update information into two or more Hi-Encrypt message packages, and where each party alternates by sending the other one of the required packages in an alternating manner, similar to that used with an "interlink protocol". This allows for each party to separately initialize an RNG pair between them, and thereby initialize 2 separate communication channels. The method demonstrated above may also be used during normal operations to prevent "man-in-the-middle" attacks.

This RNG initialisation and synchronization procedure may be used indefinitely as part of the standard encryption operation, or it may be randomly introduced at predetermined points in time, or it may be used to exchange recovery information which may be used to automatically reinitiate communication links under predetermined conditions.

Certain embodiments of the current invention include, but are not limited to embodiments where data or information must be encrypted locally. In the case of where local encryption is required, such as encrypting local keys, encrypting local data, backup RNG updates or RNG configurations, it is important to ensure that decryption keys are not readily available locally. In such a case, a separate key management process may be used at a station for the purpose of key management, in that information indicative of the local entity which requires encryption (userID, password, machineID, processID, serviceID etc.) may be converted to an initial keystream or key, which may be used to Hi-Encrypt a random number sequence (or vice versa) into a second keystream or key. The ensuing keystream or key is then used to Hi-Encrypt the information or data which needs to be secured. The secured and encrypted data may then be stored with an identifier, and the initial random sequence. Any information which relates specifically or is indicative of a specific entity (user, machine, process, address, permissions, RNGs, links etc.) may be Hi-Encrypted in such a manner.

Certain embodiments of the current invention include, but are not limited to embodiments where Hi-Encryption of messages, information, random sequences, random updates, random feedback or any other information may be conducted with any other existing encryption algorithms or combinations of encryption algorithms, including but not limited to asymmetric and symmetric encryption algorithms, ciphers or cryptosystems. Multiple encryption and decryption algorithms may be applied in any order during encryption and decryption. For example, random updates or feedback may be encrypted or super-encrypted with an asymmetric public or private key pair shared between the sender and the receiver, prior to being inserted into a data transmission stream package of variable length (containing message data, encrypted random updates, control information and additional symmetric and asymmetric keys), which is then subjected to a super-encryption process prior to transmission of the crypto-stream. At the receiving end, the crypto-stream can be decrypted or super-decrypted, whereupon the data, control information and the encrypted random update can be extracted. The encrypted random updates can then be decrypted at the receiving end and applied according to an agreed predetermined characteristic. In addition, the application of random updates may include the update being applied to any number of synchronized or unsynchronized RNGs at any of the multitudes or plurality of sending and receiving stations. In addition, RNG update sequences may also include the transfer of new asymmetric or symmetric keys in that RNG update sequences may contain such key values. In addition, RNG update sequences may be transferred to other parties and then be subject to amendment by symmetric or asymmetric keys, which may accompany the updates by way of encrypting, converting, appending, inserting, or replacing the key material with random update information, or vice versa, where random update information is encrypted, converted, inserted, appended or replaced by key information.

Message Packaging

Certain embodiments of the current invention include, but are not limited to embodiments where one or more single or combined sequences of information indicative of data, or indicative of RNG update information, or indicative of specific characteristics of an entity (user, machine, program, service, port, address, channel, device, or system, authentication, identification), or indicative of management and control information required for effective management of cryptosystem activities or actions, is encrypted or super-encrypted using one or more keystreams. This may include combining or packaging message data, control information and random update information from one or more source PRNGs, in any combination, into a single or multiple encryption processing unit or message package, and encrypting or super-encrypting the package using one or more keystreams from one or more RNG source. The resulting cypher-stream may be used for further cryptographic purposes such as initialisation vectors, RNG updates, user and entity authentication, or may be stored locally for encryption of data at rest, or may be transmitted to remote locations.

In addition, the invention may use variable length message packages of any size (usually between 100 and 1536 bytes), taking into consideration resource consumption, and which may be composed of various variable length compartments for control information, messages, RNG updates or random sequences, and cryptographic management information. The primary compartment, namely the package control information compartment, may contain all information relevant to the package or the message, namely compartment sizes, message authentication digest information, total message size to be transmitted, and a random number which is used to obfuscate such information. The message compartment may contain the message or a portion of the message being transmitted. The random information compartment contains random entropy sequences such as RNG updates. The management compartment contains information which may establish predetermined conditions to be applied in the next package sequence. Package control information may usually be provided in bytes and may be about 10 to 20 bytes in length (4 bytes for total message size, 4 bytes for Message digest, 1 random byte, 2×3 bytes for compartment sizes, 2 bytes for a random sequence number and 1 byte for a package type. Package types may designate 256 different packages, RNG configurations, or encryption/decryption configurations and methods. Management information may be about 2 to 10 bytes long and is used to control the application of random entropy updates. It may indicate RNG sequences, index positions for application of information, RNG cycles to skip etc. Alternatively, it may use 2 bytes (or more) to identify any of 16535 preconfigured activities to be used in the next encryption cycle. Message information and random update compartments may be managed as a single unit or determined randomly. In order to ensure that super-encryption can be conducted with a payload less than 100%, it is important to ensure that the message constitutes at least 50% of the total message package size. For this reason, it is important to reduce the size of package control and management compartments in subsequent message packages, and to use a random number update size of about ⅛ of the message size. The lower the random number information size, the higher the rate of message transfer and the lower the payload overhead. For increased security, larger update compartments may be used. Advantageously, the initial synchronization exchanges between machines may usually entail small messages, therefore allowing for large random update compartments and an acceleration of the RNG update process. It may also be possible that for any given or randomly predetermined message/random compartment length, the proportion of message to random compartment sizes may be determined randomly. For example in specifying that random updates should be 10% of message size, if given a total size of 101 bytes, a random number between 0 and 255 (modulus 21) may determine the random sequence size, and the residue may be filled in by next set of values from the message. Alternatively, the calculation could be applied to the message. Should the message be unable to complete the required compartment, the shortfall may be covered by the random updates. The finalized assignment may then be recorded in the package control section. In a similar manner, the values contained in the management section, may also be determined randomly. In addition, the management section may be removed completely, and values within the random update sequences may be used. As mentioned above, update sequences may be subject to independent encryption prior to being inserted into the message package. In addition, the message section may contain a multitude of messages and other encrypted sequences, which may be multiplexed or randomly configured prior to insertion into the message section. Thus the present invention may be used to increase and protect the security characteristics of existing cryptosystems.

Message control information may also include error correction codes, message compression configurations, or message source identifiers or demultiplexing instructions.

The present invention operates through the use of cryptographic or encryption cycles. Encryption cycles may include the creation, composition, encryption and decryption of one or more message packages, and may include the post transmission activities of message packages such as the updating of RNGs and cryptosystem management information in preparation for the next encryption cycle. Encryption cycles are almost always dependent on previous encryption cycles in that the specific cryptographic activities for a specific cycle are determined in previous cycles, and need not be the immediately preceding cycle, since some cycles may not contain message control or cryptosystem management information, and may be composed of message information only. Once a message package has been composed, it may be subjected to an encryption cycle, which includes the application of a predetermined sequence of one or multiple encryption or super-encryption mechanisms, which may include XORing or performing a mathematical operation on the contents of the package using one keystream, shuffling the contents with the same or a different keystream, and may include further, additional or repeated encryption operations using one or more keystreams. Upon receipt at the receiving end, operations may be applied in reverse order to disassemble the package, assign it to the appropriate message streams or destinations. Following that, both stations may update RNGs appropriately, process changed RNG values to upper level RNGs, and change predetermined characteristics of the encryption system in preparation of the next encryption cycle.

Central Authority

Certain embodiments of the current invention include, but are not limited to embodiments where two or more independent entities in a network have pre-established secured communication links with a common entity or group of entities whose function may be to serve as a central authority for the identification, authentication and verification of network entities. The central authority may serve as a central communication destination where one entity may search for another entity and request a communication link to that entity via the central authority. The central authority may then, using dedicated or non-dedicated communication links to both entities, verify the identities of both parties and serve as a broker by receiving an initial communication or communication initialisation sequence such as that previously mentioned, from one entity and transferring it to the other, or it may send identical communication sequences to both parties. Once connected, the parties may or may not communicate independently of the central authority. The central authority may further be used in the event of a communication failure, or to verify additional information, or to temporarily keep communication records sent by one entity to another where one of the entities is not currently connected.

Certain embodiments of the current invention include, but are not limited to embodiments where a constant secure communication link may be maintained between a secured network entity and a central authority by way of an independent management process at a network node. The operational characteristics of this management process may be subjected to the control of the central authority and may be independent from direct entity (user, machine, operating system etc.) interaction. This communication link may also be used as an additional backup facility, or used to transfer central authority authentication or identification information when required.

Description of the Preferred Embodiment

Many different embodiments and variations of the various components of the invention have already been mentioned above. Certain embodiments of the current invention include, but are not limited to a preferred embodiment which incorporates the various methods, systems and components described above in a preferred manner due to efficiency, effectiveness, advantage, risk or perfect secrecy considerations.

Figure 6:
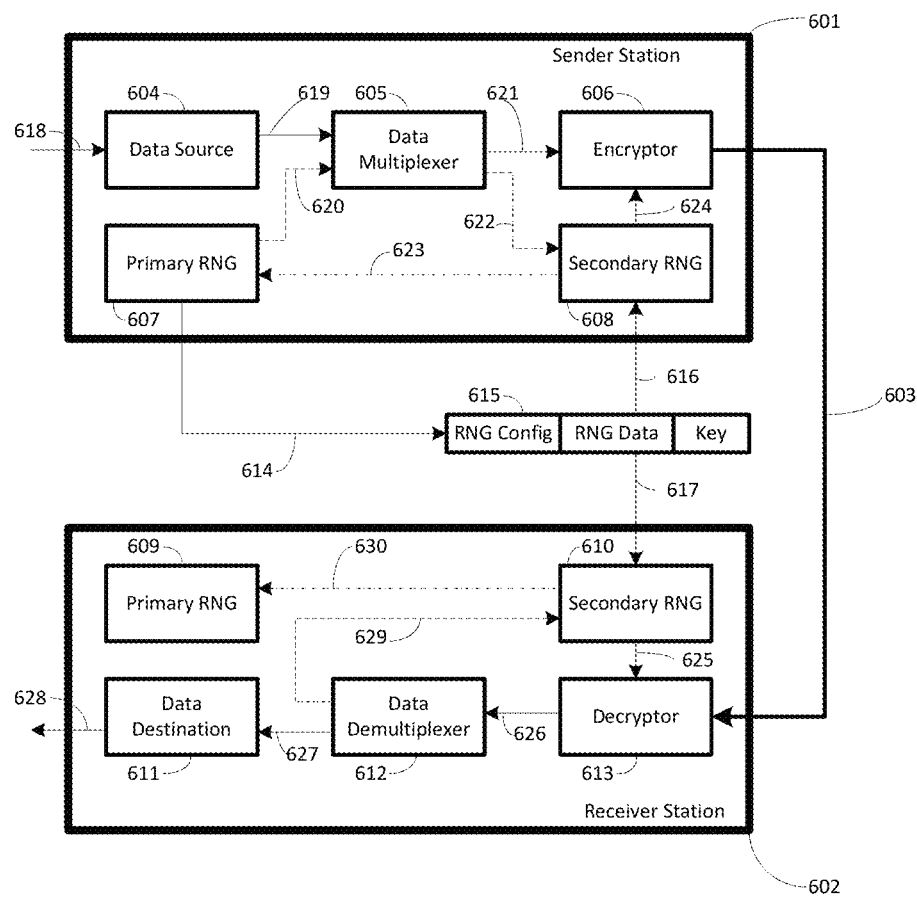
FIG. 6 is a functional block diagram illustrating the composition and signal processing steps which embody the invention, and also illustrates enhanced signal processing capabilities used in the preferred embodiment of the invention.

FIG. 6. is a functional block diagram which has been previously discussed above, illustrating enhanced random number generation and encryption capabilities and functions which embody the invention, and which will be referred to individually in describing the preferred embodiment. Whilst some information may be repeated, repetition will be kept to a minimum, and it is assumed that the reader is already acquainted with the contents of FIG. 6.

With FIG. 6 we see a diagram demonstrating the implementation of the invention between two stations, a Sender Station 601 and a Receiver Station 602 which are connected using a Secure Communication Link 603.

Primary Generators 607 609—Each station will have one primary Hi-Generator which will serve random sequences to secondary generators. For scalability purposes, more primary generators will be added to serve blocks of secondary generators. Primary generators will have a single array of random size between 1024 and 2048 bytes and 2 index pointers of 2 bytes each. Each primary generator will intermittently receive small entropy inputs from true random sources such as timings between user key presses or the lower bits of network package arrivals. Primary generators will be instantiated with a saved encrypted RNG-state file which is decrypted with the user's password.

Communication Link 603—The communication link shown in FIG. 6 is indicative of a one-way Communication Link between a sender and a receiver. A two-way channel between both stations will require running a separate sender and receiver instance at each station. With initialisation, channels will be initalised sequentially, with one channel being fully initialized before the other in order to provide a secure communication link for the initialisation of the second channel. Once the second channel is initialized, the first channel will be reinitialised.

Initialisation Sequence 615—The station initiating the first communication link will use its Primary RNG to create a random number sequence to determine the constitution of the secondary RNG, which is usually an array of 2048 bytes, give or take 512 bytes. Secondary arrays are also populated using the same number sequence. The key component is provided using a symmetric key of any size that has been provided for the communication, or a Diffie-Hellman-Merkle key exchange using a multiplicative group of integers modulo p where p is not necessarily prime. The public key will be used by the receiver to return two sets of entropy update sequences. The first sequence will be applied to the secondary RNGs whilst the second will be used to select valid and invalid sets of values during decryption/encryption by using the separate digits in numbers (e.g. 4231, may mean take 4, skip2, take 3, skip 1, or alternatively, take 4, skip 6, take 2, skip 8 etc.). The initial configuration, the RNG data and the key will all be transmitted by the sender. With a central authority, this information can be distributed using the Central Authority as a broker. Once the first channel has been synchronized, having gone through a synchronization phase of about 8192 bytes, the receiver will repeat the activity, and send the sender an initialisation package for the second channel. Once the second channel is completed, the sender will reinitialise the first channel again. With a Central authority, all information is transferred between the two stations by a broker, so initialisation routines may not require large initial synchronization exchanges.

Secondary RNGs 608 and 610—Secondary Hi-Generators will have internal arrays of at least 2048 bytes. Arrays will be able to change array sizes between encryption and decryption cycles depending on the random entropy updates they receive from primary RNGs or if receiving messages, from the other linked and synched secondary RNG. RNGs will apply their updates after every cycle, and updates will change the values in the 3 index pointers. For scalability, and to ensure there is no contention, separate sections of the array may be interacted with by multiple processes. In addition, once updates have been applied to a section of the secondary RNGs internal state, the replaced values will be sent to the station's primary RNG. Secondary generators are instantiated with every communication link. When links are terminated, the generator is closed down, but not before its state is recorded and saved locally, and encrypted by another secondary generator. This allows connections to be stood up immediately, and serves as a backup in case of errors.

Data Multiplexer 605 and 612—Responsible for packaging and unpackaging transmission information in units of bytes. A random number sequence from the primary RNG will determine the overall package size, and the data/entropy balance which is usually 8-to-1 or 12% entropy for 100% data. Data Multiplexers at the sender will get the appropriate sized data from the Data Source 604 and the entropy from the Primary generator. Data Multiplexers process packages in terms of their size. Packaged data has no impact on the overall encryption process, except to occupy data blocks in the message package. Multiplexers may also perform additional activities such as data compression and error control coding. After sending the packages to be encrypted, Multiplexers will send the entropy updates to the Secondary RNG for application. Data Demultiplexers will receive decrypted packages and pass updates to secondary RNGs, and data outputs to the Data Destination buffers.

Encryptors/Decryptors 606 and 613—Encryptors receive message packages from Data Multiplexers and apply a super-encryption process using 2 separate keys, one for an XOR and the other to shuffle the resulting cyphertext. Two random bytes will determine the starting point for linked values, and the increment to be applied. Since the message package includes a message type ID, this may be used to vary the encryption sequence, and allow for additional encryption algorithms to be introduced. In order to expedite encryption, both XOR and shuffle operations may be performed off two output bytes from the secondary RNG. Decryptors perform the identified XOR/shuffle sequence in reverse order.

The encryption operations would essentially be operating on a variable or fixed length package. Each package may contain datagram elements for internal routing, control sections for functions such as MAC authentication or error correction, a message space, and a random number generation update. Control functions could be message size. All messages would be as large as the largest datagram, with free space padded out by random number generation updates. These updates considerably "pollute" any cryptanalytic attack. One issue to consider is that states as large as 1024 bytes can be used. Under ideal conditions, it would be best to ensure that the package is at least 700 bytes or 700 bits long, preferably 1024 or 1536 bytes. The logarithmic shuffling encryption operation has the unusual characteristic that beyond 700 bytes, there are more possible shuffle operations possible than the total variation of possible message contents. Issues to consider are that decryption operations must be performed in reverse, so the state overlap issue must be kept to a minimum. It is possible to allow for single state manipulation, but then large sets of values must be held in memory and applied in reverse, defeating the secret state directive. Keeping them separated avoids collisions. To protect against external manipulation or changes, a verification value or hash can be applied to the current datagram, but that adds additional overhead. Ideally we are looking to keep the random generation updates as small as possible and apply them to random index points of the PRNG state. To save space, the first random numbers or a predetermined sequence determined by previous control transmissions can be used to determine randomization for the next sequence. The instructions for updating the sequence are sent in previous packages. Whilst seeds seem to be the norm, this essentially just restarts the PRNGs and reduces the overall entropy of the solution. Every PRNG update serves as a pollutant, as instructions for the next update and as the content of the state change. Once transmitted, updates will be applied at the remote secondary RNG which has been linked to the communication link. Naturally, in order to promote recycling of values, remote primary PRNGs will have portions of their state values changed during the feedback loop at the remote site. To prevent this, each encryption engine will operate an independent secondary PRNG which will serve cryptographic administration and maintenance functions. One of the maintenance functions is to temporarily encrypt all backup link functions and amend any feedback loops if required through independent internal XOR operations.

What is claimed is:

1. A method of providing a secure communication link between system nodes, using a cryptosystem for dynamic encryption/decryption to encrypt and decrypt data and one-time pads which are used as entropy updates, the method comprising:

initialising identical synchronised secondary random number generators (RNGs) at an encryption node (RNG1B) and a decryption node (RNG2B) using a shared initial key Ki to populate the secondary RNG random length arrays and t and u pointers with random values, with said secondary RNGs being used to generate identical subsequent encryption and decryption keys (K);

generating random sequences at RNG1B and RNG2B to produce encryption and decryption keys, said generating including the steps of (i) t:=(t+1) mod k, (ii) u:=(u+A[t]) mod k, (iii) v:=(A[t]+A[u]) mod k, and (iv) A[v] being the reference to the output value;

providing an information message (M) to be encrypted at the encryption node;

a one-time pad entropy update random message (R) at the encryption node using a primary RNG (RNG1A) using said generation steps of (i) t:=(t+1) mod k, (ii) u:=(u+A[t]) mod k, (iii) v:=(A[t]+A[u]) mod k, and (iv) A[v] being the reference to the output value;

performing an encryption operation by completing an encryption cycle, comprising joining a segment (M1) of said information message (M) to a segment (R1) of said one-time pad entropy update random message (R) to produce a joined message (RM1) and encrypting said joined message using multiple encryption ciphers using the current encryption keys from RNG1B, to produce a ciphertext segment (C1);

performing an entropy update operation at the encryption node after the completion of every encryption cycle by using the random values in said R segment to alter the array and variable of RNG1B;

repeating the previous encryption and entropy update operations to encrypt subsequent M segments and R segments using subsequent decryption keys from RNG1B, and using the respective R segments for entropy updates on RNG1B until the information message M has been fully encrypted resulting in a sequential series of ciphertext segments (C);

transmitting the sequential series of cyphertext segments from the encryption node to the decryption node;

performing a decryption operation by receiving the sequential series of said ciphertext segments (C) at the decryption node and then performing a decryption operation on a ciphertext segment (C1) by applying the encryption operations in reverse and using the decryption keys generated by RNG2B to output the message segment M1 and the random entropy segment R1;

performing an identical entropy update operation at the decryption node after the completion of every encryption cycle by using each subsequently extracted R segment to alter internal state random values in RNG2B;

repeating the previous decryption and identical entropy update operations by decrypting subsequent cyphertext segments using the subsequent decryption keys from RNG2B, and using the extracted R sequences as entropy updates on RNG2B until the entire sequence of ciphertext segments have been decrypted.

2. The method of claim 1, further comprising, after every encryption cycle, altering one or more of:
- a selection, number, and sequence of the encryption ciphers;
- a size and composition of the internal state of any random number generators;
- a characteristics of the random number generators;
- a composition of the random number generators;
- a value of the random number generators;
- a composition and characteristics of any encryption or decryption cycle.

3. The method of claim 1, wherein said entropy update operations, result in an output set of values being produced which may then be used to further update, augment or increase the entropy of any other random number generator used by the cryptosystem.

4. The method of claim 1, wherein said joining of said information messages, entropy update one-time pads, and dynamic control variables may include additional symmetric or asymmetric key values and further comprise joining various sections or lengths of said values.

5. The method of claim 1, wherein performing the encryption operation further comprises using multiple encryption steps, algorithms, or ciphers, the composition and sequence of which randomly determined at runtime by values contained within the one-time pad entropy update segment, or by values contained within the control information.

6. The method of claim 1, further including where control information values are derived from values in the one-time pad random entropy update messages, and wherein said control values are used to determine the subsequent cyphertext segment characteristics, including cyphertext segment length, information message segment length, random entropy segment length, block length and decryption key length.

7. The method of claim 1 wherein the cyphertext segment or dynamic control information values comprise error correction or message authentication verification information, or where the cyphertext segment transfers user authentication information, user mutual authentication information, or additional symmetric or asymmetric authentication keys.

* * * * *